(12) United States Patent
Rosenbaum et al.

(10) Patent No.: US 11,847,444 B2
(45) Date of Patent: *Dec. 19, 2023

(54) AUTOMATICALLY UPDATING DOCUMENTATION

(71) Applicant: S.T. Swimm Tech Ltd, Tel-Aviv (IL)

(72) Inventors: Omer Rosenbaum, Tel-Aviv (IL); Oren Toledano, Jerusalem (IL); Tom Ahi-Dror, Ramat Gan (IL); Gilad Navot, Tel-Aviv (IL)

(73) Assignee: S.T. Swimm Tech Ltd, Tel-Aviv (IL)

( * ) Notice: Subject to any disclaimer, the term of this patent is extended or adjusted under 35 U.S.C. 154(b) by 129 days.

This patent is subject to a terminal disclaimer.

(21) Appl. No.: 17/481,346

(22) Filed: Sep. 22, 2021

(65) Prior Publication Data

US 2022/0206789 A1    Jun. 30, 2022

Related U.S. Application Data

(63) Continuation-in-part of application No. 17/137,466, filed on Dec. 30, 2020, now Pat. No. 11,132,193.

(51) Int. Cl.
*G06F 8/73* (2018.01)
*G06F 8/71* (2018.01)

(52) U.S. Cl.
CPC . *G06F 8/73* (2013.01); *G06F 8/71* (2013.01)

(58) Field of Classification Search
CPC .................................... G06F 8/73; G06F 8/71
USPC ......................................................... 717/122
See application file for complete search history.

(56) References Cited

U.S. PATENT DOCUMENTS

| | | | |
|---|---|---|---|
| 6,256,773 B1 | 7/2001 | Bowman-Amuah | |
| 10,204,112 B1 | 2/2019 | Bhargava et al. | |
| 11,132,193 B1 * | 9/2021 | Rosenbaum | G06F 8/73 |
| 2011/0047133 A1 | 2/2011 | Alpern et al. | |
| 2015/0378971 A1 | 12/2015 | Fischer | |

(Continued)

FOREIGN PATENT DOCUMENTS

| | | |
|---|---|---|
| WO | WO 2022/144872 | 7/2022 |
| WO | WO 2023/047398 | 3/2023 |

OTHER PUBLICATIONS

Notice of Allowance dated Jun. 3, 2021 From the US Patent and Trademark Office Re. U.S. Appl. No. 17/137,466. (4 Pages).

(Continued)

*Primary Examiner* — John Q Chavis

(57) ABSTRACT

A method comprises executing a code in a development environment for: documenting versions of source files of a software program in a plurality of source documentation objects, where at least one of the source documentation objects comprises a textual description comprising one or more text-extracts, each text-extract comprising at least one marked token extracted from one of the versions of the source files; accessing a new version of a source file; performing an identification of when at least one updated token in the new version is different from the marked token; and in response to the identification: classifying the updated token according to differences identified between the updated token and the marked token; and subject to the classification being a member of a set of updatable changes, generating an updated source documentation object by modifying the text-extract in the textual description according to the classification and the differences.

21 Claims, 16 Drawing Sheets

(56) References Cited

U.S. PATENT DOCUMENTS

| | | |
|---|---|---|
| 2016/0098263 A1 | 4/2016 | Spivak et al. |
| 2016/0170746 A1 | 6/2016 | Neubeck et al. |
| 2019/0050814 A1 | 2/2019 | Surkov et al. |
| 2020/0379737 A1 | 12/2020 | Pezaris |
| 2020/0379752 A1 | 12/2020 | Rodrigues Rosa Junior |

OTHER PUBLICATIONS

Official Action dated Mar. 10, 2021 From the US Patent and Trademark Office Re. U.S. Appl. No. 17/137,466. (8 Pages).
International Search Report and the Written Opinion dated Jan. 31, 2023 From the International Searching Authority Re. Application No. PCT/IL2022/051011 (8 Pages).
International Search Report and the Written Opinion dated Mar. 30, 2022 From the International Searching Authority Re. Application No. PCT/IL2021/051523. (19 Pages).

* cited by examiner

600

```
0.1 Let hp be a copy of the marked segment in the version of the source file.
0.2 Let dpf be one or more differences identified between the updated segment and
the copy of the marked segment.
0.3 Let ui be an index in hp of upper inner context line.
0.4 Let li be an index in hp of lower inner context line.

0.5 Let hp consist of lines L = {l1, l2, ... , lk}.
0.6 Let inner hunk IH = {lj; l in L and ui <= j <=li}.

0.7 Let s be a sequence of characters {c1, c2, ... ck}.
0.8 Let the delinted form of s be { c in s: c is not a member of a set of delint
characters}, and every single-quote ' or ` transformed to double-quote ".

// For example - for the following sequence:
// ab'c;d e\nf
// The delinted form is:
// abcdef 1.      Let delinted-any-line be false.
2.      For every line Lh in IH:
2.1.    If the change type of Lh in hp is ADDITION: continue
2.2.    Let ldpf be the corresponding line in dpf.
2.3.    If the change type of ldpf in dpf is DELETION: continue
2.4.    Let a be the side a of lh.
2.5.    Let b be the side b of ldpf.
2.6.    If the delinted form of a is equal to the delinted form of b
2.6.1.      Set delinted-any-line to true
2.6.2.      Modify hp such that lha is set to delinted form of ldpfb
2.6.3.      Modify dpf such that Ldpfa is set to delinted from of ldpfb
2.6.4.      Modify dpf such that the change type of ldpf is context.
3.      Return delinted-Any-line
```

```
0.1 Let hp be a copy of the marked segment in the version of the source file.
0.2 Let dpf be one or more differences identified between the updated segment and
the copy of the marked segment.
0.3 Let ui be an index in hp of upper inner context line.
0.4 Let li be an index in hp of lower inner context line.

0.5 Let hp consist of lines L = {l1, l2, ... , lk}.
0.6 Let inner hunk IH = {lj; l in L and ui <= j <=li}.

// If the inner context line and upper context line have not been changed between
// the version and the new version, this module updates all of the lines between ui
// and li in hp to be the same as in the updated segment.
// If the line is deleted as part of hp and has been modified in the new version -
// it will be deleted in the updated version of hp.
// If a new line has been added in the new version - it will be deleted.
// If the line has been deleted in the new version - it will be
// excluded from hp.

1000. If (li - ui) < 2 return falsereturn false.
1001. Let ldpfui be the corresponding line of lui in dpf.
1002. Let ldpfli be the corresponding line of lli in dpf.
1003. if (the change type of ldpf is not CONTEXT) or (the change type of ldpf is not
CONTEXT) return false.
1004. Let indexH = ui
1005. Let indexD = index of ldpfui  within dpf
1006. Let actual_line_number_ui be the actual line number of lui in fileA.
1007. Let actual_line_number_li be the actual line number of lli in fileA.
1008. For line_number in {actual_line_number_li,...,actual_line_number_ui}:
1008.1.      While the change type of lindexH of hp is ADDITION
1008.1.1.    indexH += 1
1008.2.      While (the change type of line lindexD of dpf is ADDITION) or  (the
actual line number of indexD of dpf equals line_number)
1008.2.1.    If the change type of line lindexD of dpf is CONTEXT - Break
1008.2.2.    If the change type of line lindexD of dpf is DELETION
1008.2.2.1. Remove lindexh from hp
1008.2.2.2. indexH -= 1
1008.2.3.    If the change type of line lindexD of dpf is UPDATE
1008.2.3.1. Modify the content of fileA of lindexH in hp to be the contents of fileB
of lindexD of dpf.
1008.2.4.    If the change type of line lindexD of dpf is ADDITION
1008.2.4.1. Add a line object to hp with a change type of DELETION, where the
content is that of fileB within line lindexD of dpf.
1008.2.4.2. indexH += 1
1008.2.5.    indexD += 1
1008.3.      indexH += 1
1008.4.      line_number += 1
1009. Return true
```

```
0.1 Let hp be a copy of the marked segment in the version of the source file.
0.2 Let dpf be one or more differences identified between the updated segment and
the copy of the marked segment.
0.3 Let ui be an index in hp of upper inner context line.
0.4 Let li be an index in hp of lower inner context line.

0.5 Let hp consist of lines L = {l1, l2, ... , lk}.
0.6 Let inner hunk IH = {lj; l in L and ui <= j <=li}.

2000. Let ldpfui be the corresponding line of lui in dpf.
2001. If ui equals li (there is only one change line within hp)
2001.1.      If the change type of lui is not UPDATE
2001.1.1.    Return false
2001.2.      Let rhc = ui
2002. Else
2002.1.      Let ldpfli  be the corresponding line of lli in dpf.
2002.2.      If (the change type of ldpfui is UPDATE) and (the change type of ldpfli
is CONTEXT)
2002.2.1.    Let rhc =ui
2002.3.      Else if (the change type of ldpfui is CONTEXT) and (the change type of
ldpfli is UPDATE)
2002.3.1.    Let rhc =li
2002.4.      Else
2002.4.1.    Return false
2003. Let ldpfrhc  be the corresponding line of lrhc in dpf.
2004. If  the change of ldpfrhc is a within-line-change
2004.1.      Modify the content of fileA of lrhc in hp to be the contents of fileB of
ldpfrhc of dpf.
2004.2.      Return true
2005. Return false
```

AUTOMATICALLY UPDATING DOCUMENTATION

RELATED APPLICATION

This application is a Continuation-in-Part (CIP) of U.S. patent application Ser. No. 17/137,466 filed on Dec. 30, 2020, the contents of which are incorporated herein by reference in their entirety.

FIELD AND BACKGROUND OF THE INVENTION

Some embodiments described in the present disclosure relate to file documentation and, more specifically, but not exclusively, to documenting files in a development environment.

Textual files are used in a variety of fields to describe one or more structures of the field, where the textual file is formatted in an identified scheme of the field. One example is the field of software code development, where a source file of a software program is formatted according to a schema of a programming language or a data object, for example a JavaScript Object Notation (JSON) file or an Extended Markup Language (XML) file. Another example is a repository of procedures, for example test protocols or customer service procedures, where a source file describes one or more procedures or protocols of a field. Yet another example is a repository of documents stored in an identified format, for example a Google Docs repository or a repository comprising documents in Microsoft Word format.

As used herein, the term documentation refers to text that accompanies a file, or part of a file, in order to describe the file or the part of the file for a human. Documentation may include one or more images in addition to, or instead of, the text. Some documentation explains a structure described by the file. Some documentation explains how to use the file or a system produced using the file. Some documentation explains how a procedure described by the file works. Some documentation explains how a system produced using the file works.

There exist environments where one or more of a plurality of files are modified over time, for example source code files in a development environment. In such environments, documentation text describing an early version of a file may no longer explain, or describe, correctly a later version of the file.

To preserve the relevance of documentation text to a file, or part of a file, described thereby, there is a need to update the documentation text in a manner synchronous with modifications to the file.

SUMMARY OF THE INVENTION

Some embodiments of the present disclosure describe a system and a method for automatically updating one or more source documentation objects documenting one or more segments of one or more source files.

The foregoing and other objects are achieved by the features of the independent claims. Further implementation forms are apparent from the dependent claims, the description and the figures.

According to a first aspect, a method comprises executing a code in a development environment for: documenting a plurality of versions of a plurality of source files of a software program in a plurality of source documentation objects, where at least one of the plurality of source documentation objects comprises a textual description comprising one or more text-extracts, each text-extract comprising at least one marked token extracted from one of the plurality of versions of the plurality of source files; accessing a new version of a source file of the plurality of source files, where the new version is newer than a version of the source file from which at least one text-extract of the one or more text-extracts of the textual description was extracted; performing an identification of when at least one updated token in the new version of the source file, equivalent to the at least one marked token of the at least one text-extract, is different from the at least one marked token; and in response to the identification: classifying the at least one updated token as one of a set of change classifications according to one or more differences identified between the at least one updated token and the at least one marked token; and subject to the change classification being a member of a set of updatable changes, generating an updated source documentation object by modifying the at least one text-extract in the textual description according to the change classification and the one or more differences. Classifying the at least one updated token as one of a set of change classifications according to the one or more differences and modifying the at least one text-extract according to the change classification increases accuracy of the updated source documentation object compared to an object generated only according to the one or more differences.

According to a second aspect, an apparatus comprises at least one hardware processor configured for executing a code in a development environment for: documenting a plurality of versions of a plurality of source files of a software program in a plurality of source documentation objects, where at least one of the plurality of source documentation objects comprises a textual description comprising one or more text-extracts, each text-extract comprising at least one marked token extracted from one of the plurality of versions of the plurality of source files; accessing a new version of a source file of the plurality of source files, where the new version is newer than a version of the source file from which at least one text-extract of the one or more text-extracts of the textual description was extracted; performing an identification of when at least one updated token in the new version of the source file, equivalent to the at least one marked token of the at least one text-extract, is different from the at least one marked token; and in response to the identification: classifying the at least one updated token as one of a set of change classifications according to one or more differences identified between the at least one updated token and the at least one marked token; and subject to the change classification being a member of a set of updatable changes, generating an updated source documentation object by modifying the at least one text-extract in the textual description according to the change classification and the one or more differences.

According to a third aspect, a software program product for a development environment comprises: a non-transitory computer readable storage medium; first program instructions for documenting a plurality of versions of a plurality of source files of a software program in a plurality of source documentation objects, where at least one of the plurality of source documentation objects comprises a textual description comprising one or more text-extracts, each text-extract comprising at least one marked token extracted from one of the plurality of versions of the plurality of source files; second program instructions for accessing a new version of a source file of the plurality of source files, where the new version is newer than a version of the source file from which at least one text-extract of the one or more text-extracts of the textual description was extracted; third program instructions for performing an identification of when at least one updated token in the new version of the source file, equivalent to the at least one marked token of the at least one text-extract, is different from the at least one marked token; and fourth program instructions for in response to the identification: classifying the at least one updated token as one of a set of change classifications according to one or more differences identified between the at least one updated token and the at least one marked token; and subject to the change classification being a member of a set of updatable changes, generating an updated source documentation object by modifying the at least one text-extract in the textual description according to the change classification and the one or more differences. The first, second, third and fourth program instructions are executed by at least one computerized processor from the non-transitory computer readable storage medium.

With reference to the first and second aspects, in a first possible implementation of the first and second aspects the code development environment comprises a file version control system (VCS), the plurality of source files is managed by the VCS; and the method further comprises identifying the new version in the VCS, where the new version was added to the VCS after the version of the source file from which the at least one text-extract of the one or more text-extracts of the textual description was extracted. Optionally, the plurality of source documentation objects is organized in at least one documentation file each having a plurality of documentation versions, the plurality of documentation versions of the at least one documentation file is managed by another VCS, and each documentation version of the at least one documentation file in the other VCS is associated with a version of at least one of the plurality of source files in the VCS. Organizing a plurality of documentation versions in a VCS increases accuracy of documentation associated with a version of a source file.

With reference to the first and second aspects, in a second possible implementation of the first and second aspects the source file is organized in a plurality of lines and the at least one text-extract is at least part of one line of the plurality of lines of the version of the source file. Optionally, the method further comprises identifying in the new version of the source file an equivalent line, equivalent to the one line of the plurality of lines of the version of the source file. Optionally, identifying the equivalent line comprises: computing a plurality of line matches between a respective plurality of lines of the version of the source file and another respective plurality of lines of the new version of the source file; and identifying a line match of the plurality of line matches comprising the one line. Computing a plurality of line matches between the respective plurality of lines of the version of the source file and the other respective plurality of lines of the new version of the source file facilitates using line matching methods to identify the equivalent line, thus reducing cost of implementation of the method.

With reference to the first and second aspects, in a third possible implementation of the first and second aspects performing the identification of when the at least one updated token in the new version of the source file is different from the at least one marked token comprises identifying the at least one updated token in the equivalent line. Optionally, identifying the at least one updated token in the equivalent line comprises: computing a sequence of tokens of the one line; computing a sequence of new tokens of the equivalent line; computing a plurality of token matches between the sequence of tokens and the sequence of new tokens; identifying at least one token match of the plurality of token matches comprising the at least one marked token; and identifying the at least one updated token in the at least one token match. Optionally, computing the plurality of token matches comprises: organizing the sequence of tokens in a sequence of token lines, each consisting of one of the sequence of tokens in order of the sequence of tokens; organizing the sequence of new tokens in a sequence of new token lines, each consisting of one of the sequence of new tokens in order of the sequence of new tokens; and computing a plurality of token line matches between the sequence of token lines and the sequence of new token lines. Organizing the sequence of tokens in a sequence of token lines and the sequence of new tokens in a sequence of new token lines allows using a line matching tool to compute the plurality of token matches, thus reducing cost of implementation of the method. Optionally, classifying the at least one updated token comprises: identifying in the sequence of tokens a plurality of context tokens; identifying in the sequence of new tokens a plurality of equivalent context tokens according to the plurality of token matches; computing a context similarity score indicative of a confidence level that the plurality of context tokens is similar to the plurality of equivalent context tokens, according to a result of applying at least one context similarity test; and computing a classification of the at least one updated token further according to the context similarity score; wherein at least one of: at least some of the plurality of context tokens immediately precede the at least one marked token in the one line; and at least some other of the plurality of context tokens immediately follow the at least one marked token in the one line. Computing the classification of the at least one updated token according to the context similarity score increases accuracy of the classification. Optionally, classifying the at least one updated token further comprises: when one or more differences are identified between the at least one updated token and the at least one marked token, classifying the updated token as "non-updatable change" subject to the context similarity score being less than an outdated threshold score, otherwise classifying the updated token as one of the set of updatable changes; and when failing to identify the one or more differences between the at least one updated token and the at least one marked token, classifying the updated token as "no change" subject to the context similarity score being greater than or equal to a verified threshold score, otherwise classifying the updated token as one of the set of updatable changes. Optionally, the verified threshold score is 90%. Optionally, the outdated threshold score is 40%. Comparing the context similarity score to one or more thresholds increases accuracy of the classification. Optionally, applying the at least one context similarity test comprises at least one of: computing a first distance between the at least one marked token and the at least one updated token, computing a second distance between the at least some of the plurality of context tokens immediately preceding the at least one marked token and one or more of the plurality of equivalent context tokens equivalent thereto, and computing a third distance between the at least some other of the plurality of context tokens immediately following the at least one marked token and one or more other of the plurality of equivalent context tokens equivalent thereto.

With reference to the first and second aspects, or the third implementation of the first and second aspects, in a fourth possible implementation of the first and second aspects modifying the at least one text-extract in the textual description comprises: identifying in the at least one token match a first marked match comprising a first marked token of the at least one marked token and a last marked match comprising a last marked token of the at least one marked token; selecting from the at least one token match a sequence of marked token matches starting with the first marked match and ending with the last marked match; selecting from the sequence of marked token matches a sequence of updated marked matches each comprising an updated token of the sequence of new tokens; and replacing in the textual description the at least one marked token with a sequence of updated tokens according to the sequence of updated marked matches. Selecting a sequence of marked token matches starting with the first marked match and ending with the last marked match and selecting therefrom a sequence of updated marked matches each comprising an updated token increases accuracy of the updated source documentation object.

With reference to the first and second aspects, in a fifth possible implementation of the first and second aspects modifying the at least one text-extract in the textual description according to the change classification and the one or more differences comprises replacing the at least one marked token with the at least one updated token. Replacing the at least one marked token with the at least one updated token increases accuracy of the updated source documentation object.

With reference to the first and second aspects, in a sixth possible implementation of the first and second aspects the at least one marked token is one of: a software program identifier comprising a sequence of characters according to a syntax of a programming language of the software program, a delimiter character selected from a set of delimiter characters of the programming language of the software program, a sequence of characters depicting a word in a natural language, and a natural language delimiter character according to another syntax of a natural language. Optionally, the set of change classifications consists of "change to lint-characters", "change to an inner block", "updatable single line change", "no change", and "non-updatable change". Optionally, the set of updatable changes consists of "change to lint-characters", "change to an inner block", and "updatable single line change".

With reference to the first and second aspects, in a seventh possible implementation of the first and second aspects each of the plurality of versions of the source file is associated with a checksum value, and the source documentation object further comprises the respective checksum value associated with the version of the source file.

With reference to the first and second aspects, in an eighth possible implementation of the first and second aspects the method further comprises associating the updated source documentation object with the new version of the source file; and documenting the new version of the source file with the updated source documentation object. Associating the updated source documentation with the new version of the source file increases usability of the plurality of source files.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

Figure 7:
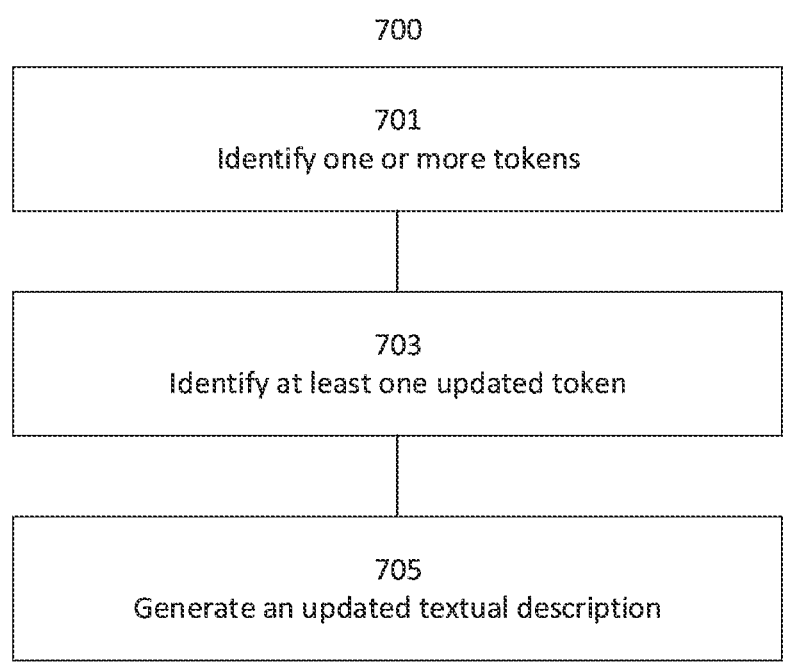
Figure 9:
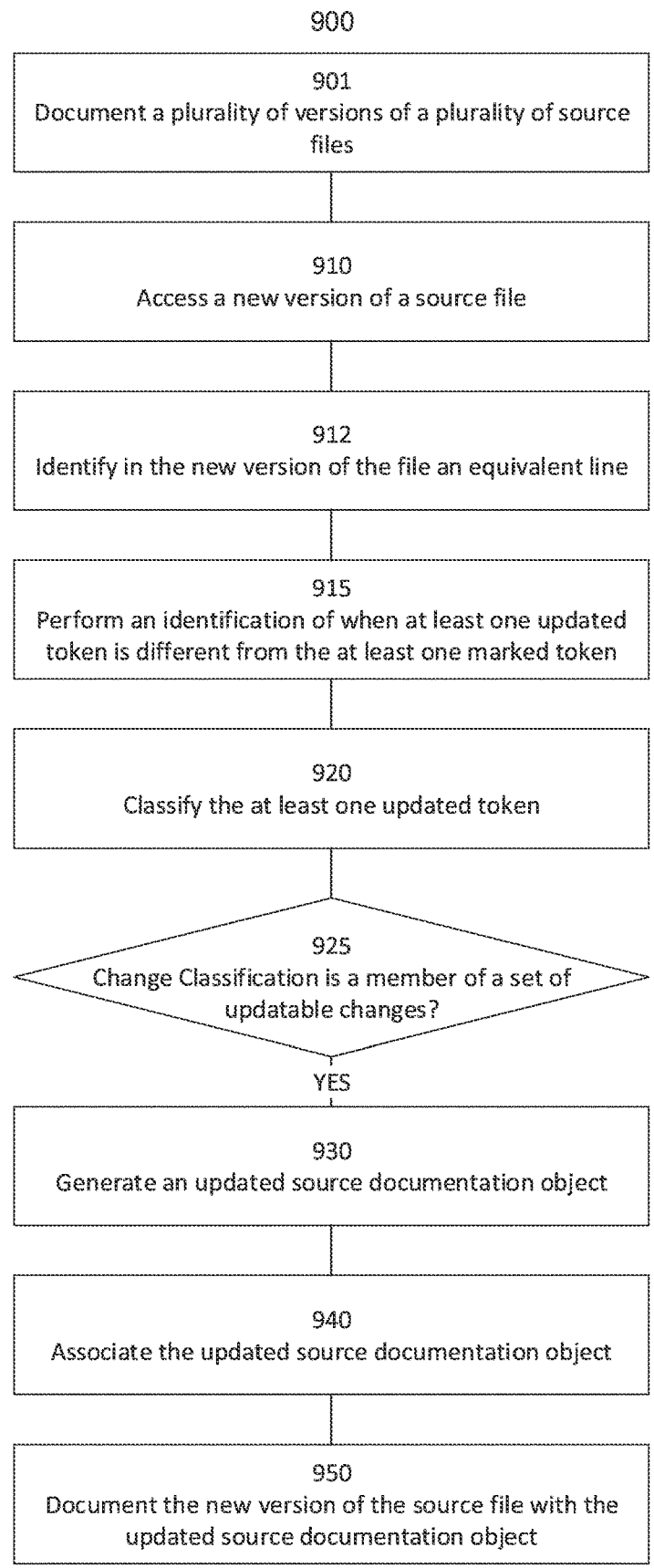
Figure 10A:
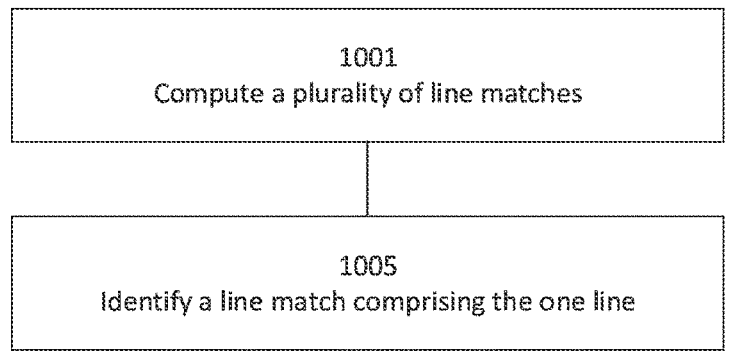
Figure 10B:
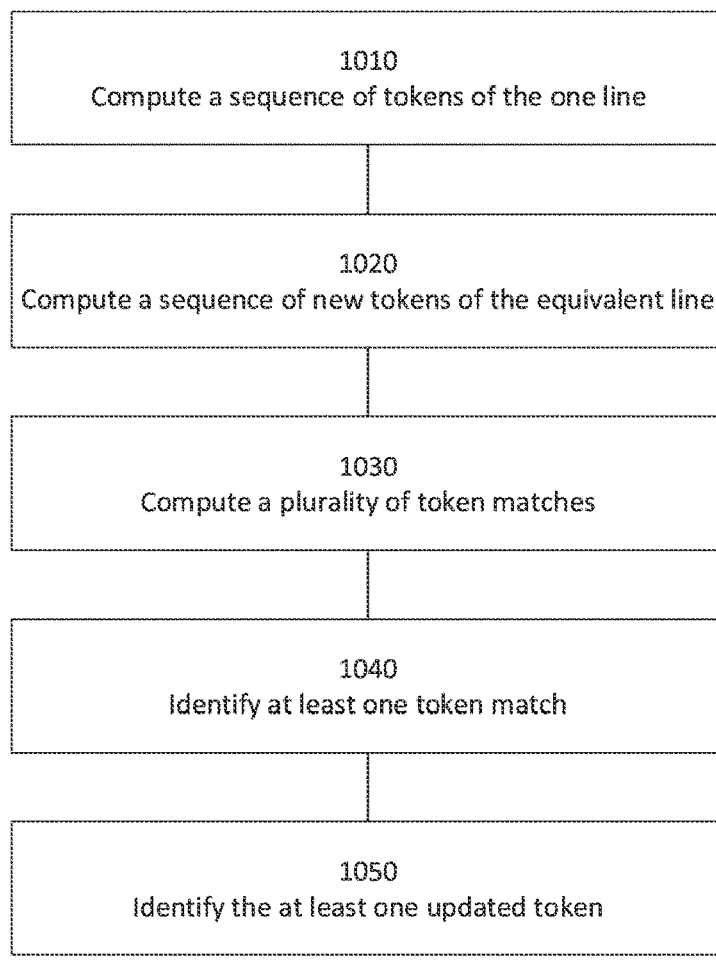
Figure 11:
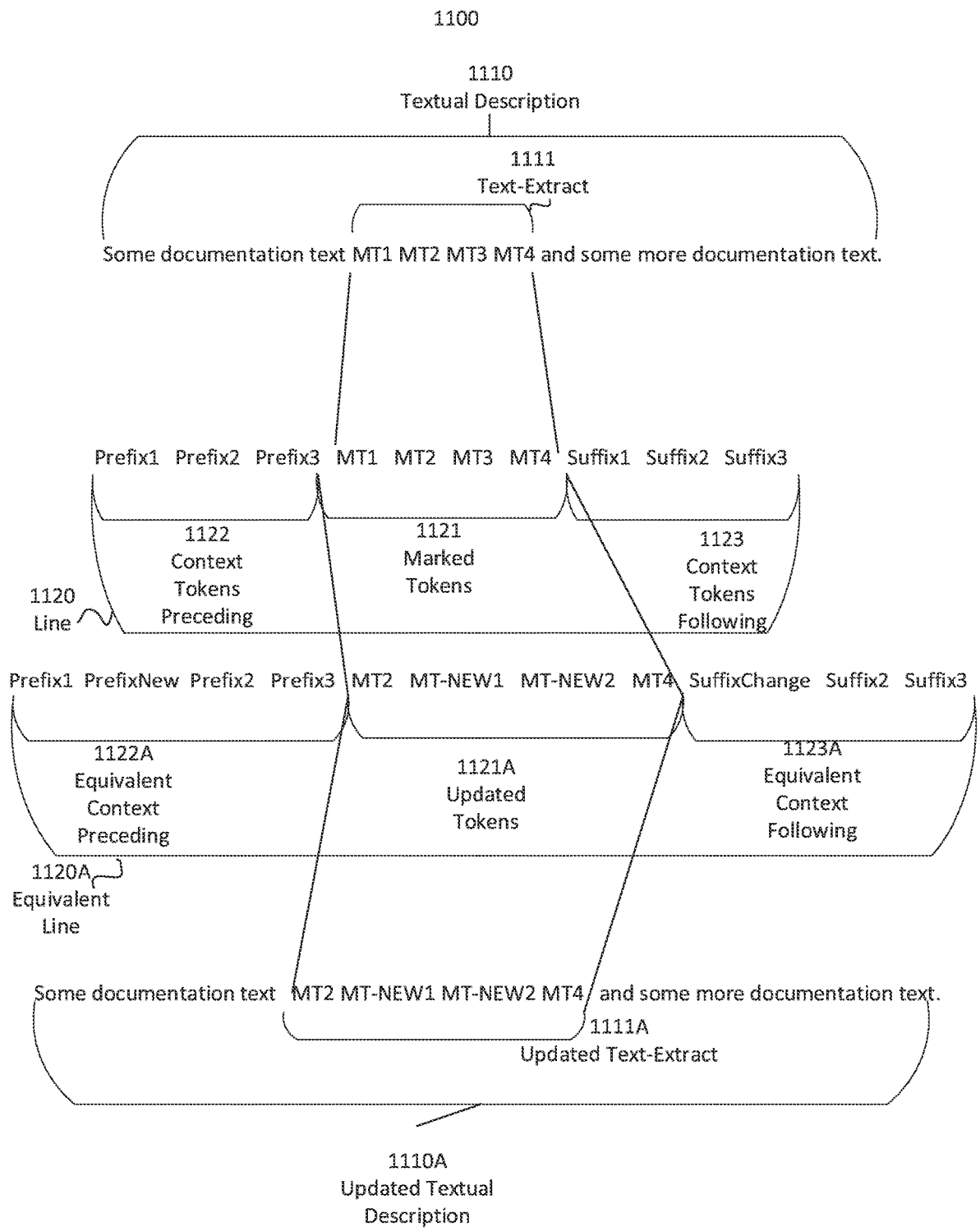
Figure 12:
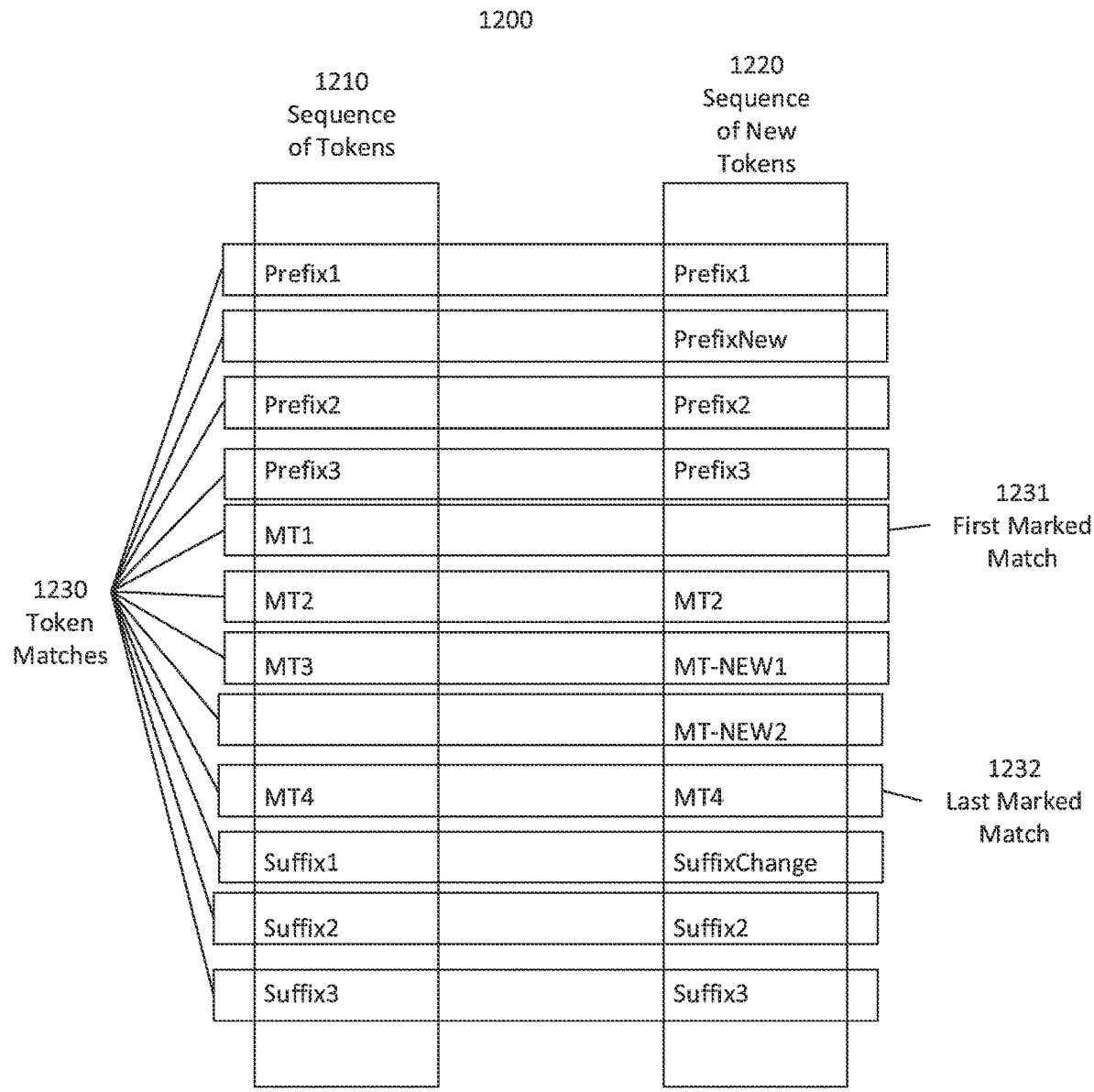
Figures 13, 13A, 13B:
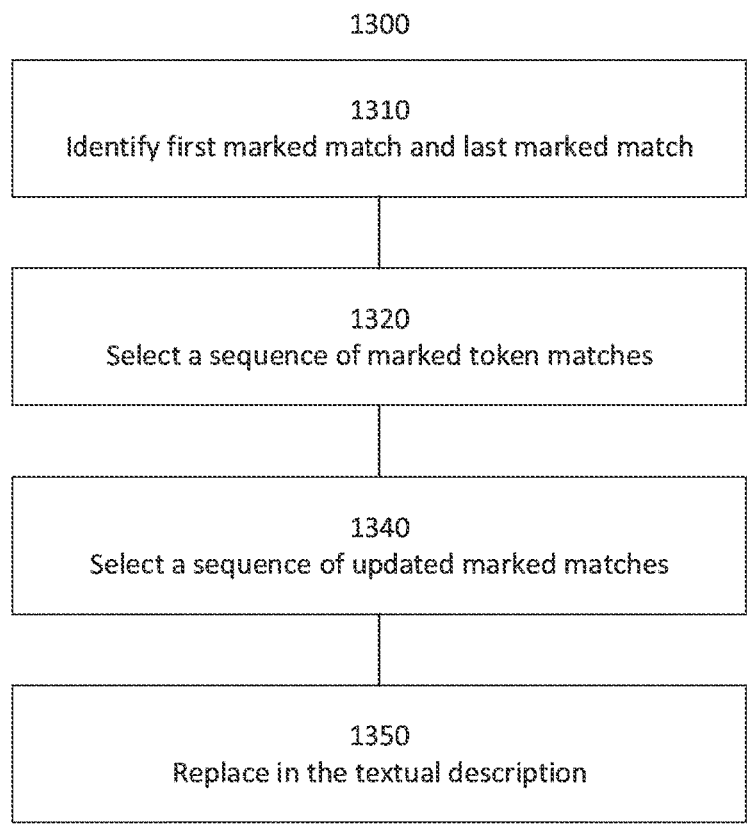

FIGS. 6A, 6B, and 6C are pseudo-code representing optional flows of operations for modifying documentation, according to some embodiments;

FIG. 7 is a flowchart schematically representing an optional flow of operations for updating documentation text, according to some embodiments;

Figure 8A:
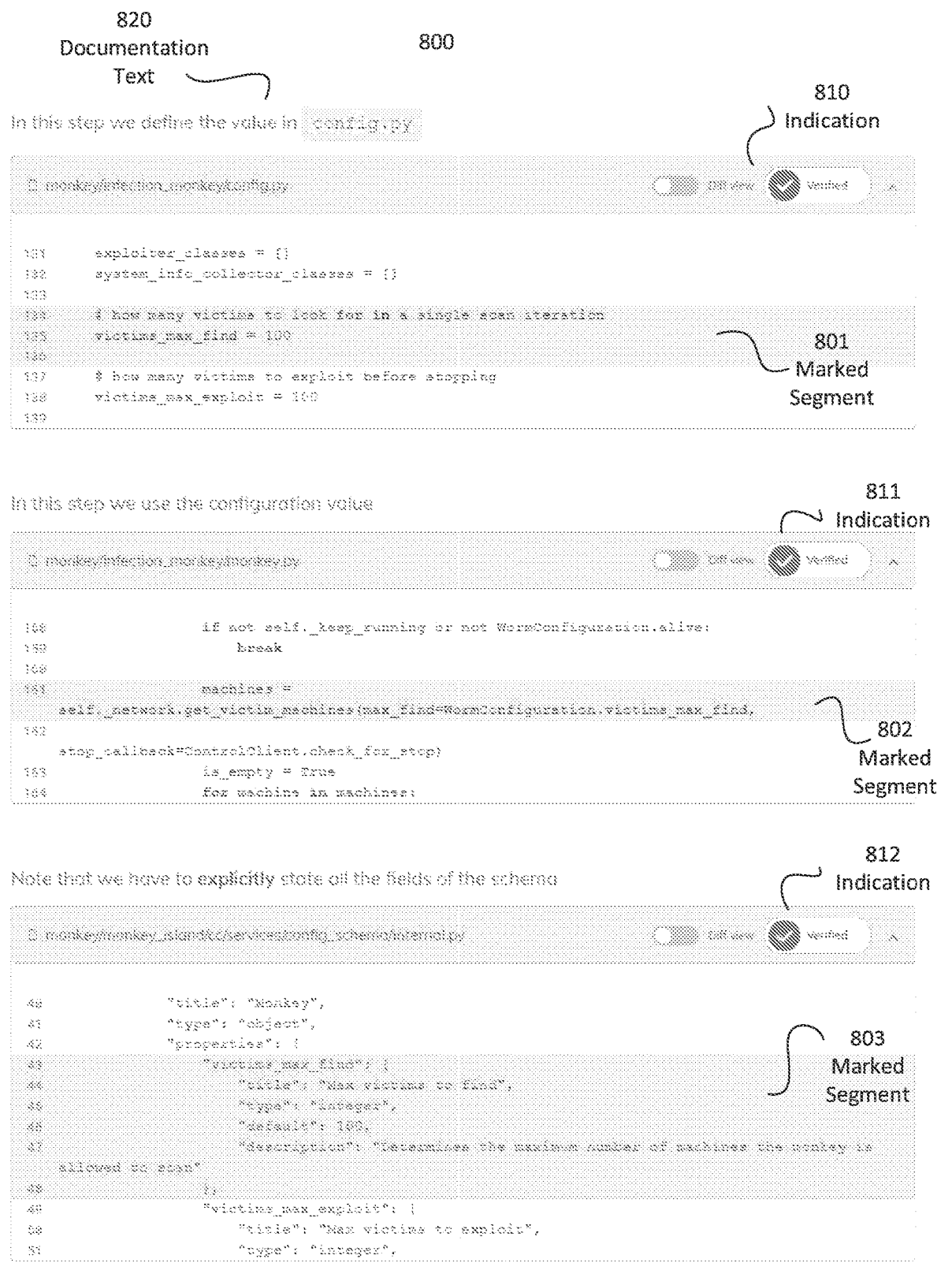
Figure 8B:
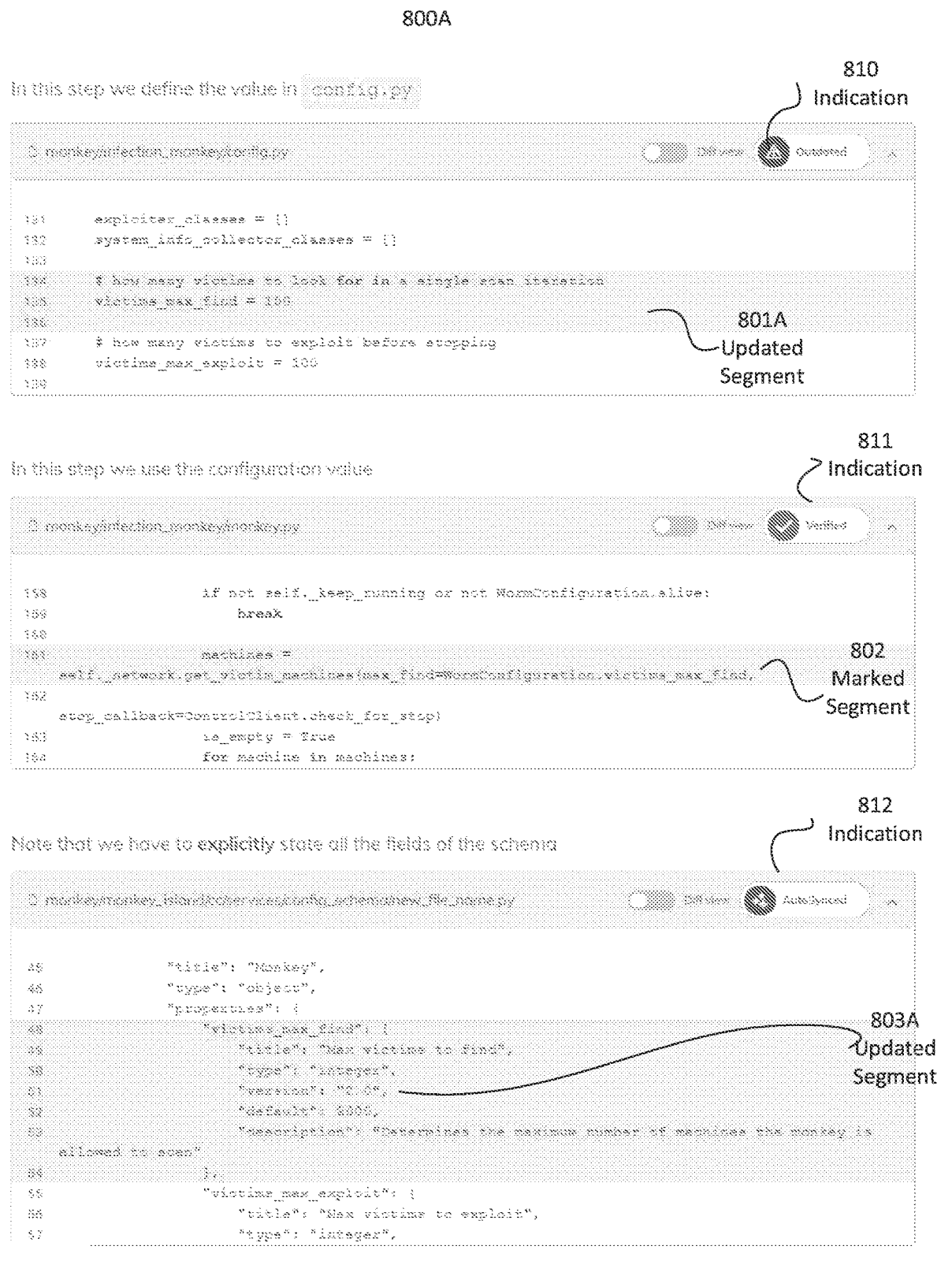

FIGS. 8A and 8B are exemplary screenshots of a development environment, according to some embodiments;

FIG. 9 is a flowchart schematically representing an optional flow of operations for updating a textual description, according to some embodiments;

FIG. 10A is a flowchart schematically representing an optional flow of operations for identifying an equivalent line, according to some embodiments;

FIG. 10B is a flowchart schematically representing an optional flow of operations for matching tokens, according to some embodiments;

FIG. 11 is a schematic diagram showing an exemplary match between lines of text, according to some embodiments;

FIG. 12 is a schematic block diagram showing an exemplary plurality of token matches, according to some embodiments;

FIG. 13 is a flowchart schematically representing an optional flow of operations for modifying one or more text-extracts, according to some embodiments;

FIG. 13A is a schematic diagram showing an exemplary sequence of marked token matches, according to some embodiments; and FIG. 13B is a schematic diagram showing an exemplary sequence of updated marked matches, according to some embodiments.

DESCRIPTION OF SPECIFIC EMBODIMENTS OF THE INVENTION

The following description focuses on, but is not limited to, updating documentation in a software development environment where a plurality of source files is a plurality of software code source files or comprises a plurality of software code files. However, embodiments are not limited to the field of software development. Some other possible embodiments include a plurality of source files that are not software code source files, for example a plurality of test protocols, a plurality of customer service procedures or a plurality of Microsoft Word documents. In addition, it should be noted that the term "source code file" refers, as used herewithin, to any file that contains original or essential data that is a starting point for processing. Some examples of processing are generating a software program and publishing digital content, for example digital text files, a web site, and digital audio/visual content files. A source code file may include program instructions of a software program. A source file may be a textual documentation file or a configuration file.

Documentation of a plurality of source files of a system that is no longer relevant, for example due to being outdated, may have a negative impact on usage of the system, or of another system generated thereby. In addition, when the plurality of source files is used to create another system, outdated documentation makes it difficult to correctly maintain the other system and additionally or alternatively correctly create it. However, despite long-term costs of poor documentation, manually writing documentation to describe the plurality of source files comes at a cost to developers of the plurality of source files, and frequently offers little immediate benefit. When a plurality of source files of an environment changes frequently, manually updating the documentation in step with the changes to the source files is cumbersome and time consuming, and as a result is often neglected, rendering the documentation irrelevant.

There exist solutions for assisting in creating documentation that automatically generate syntactic documentation providing a syntactic description of one or more structures described by the plurality of source files. For example, in a software development environment, such a solution may generate a set of interface functions, listing for each its arguments and their types. When a definition of an interface function changes, new documentation may be generated. However, some such solutions do not automatically generate semantic documentation explaining the source files, for example explaining how a function operates, and do not update a manually created documentation entry when a source file changes.

There exist other solutions that generate documentation for a plurality of source files of a software program from testing processes of the software program. Such solutions cannot be applied when no testing processes exist, or for source files not covered by the testing processes.

As used herewithin, the term "token" refers to a unit of text having a syntactic significance in a text. A token may be one or more natural language words, one or more identifiers in a formal language, for example a programming language, a character or sequence of characters distinguishing between other tokens (a delimiter), or any combination of the former. Some characters may be part of an identifier of a programming language while at the same time may be a delimiter in a natural language, for example an underscore.

Some other existing solutions insert into the source file a textual token to mark at least part of the source file documented by a manually created documentation entry. In addition, such solutions may digitally sign the documented part of the source file by inserting into the source file a digital signature, for example a hash value computed using the documented part of the source file. However, such solutions modify the source files themselves, making the source files less legible to a user using them. In addition, these solutions are susceptible to problems rising from a user inadvertently corrupting the digital signature or the textual token, for example when modifying the source file for development purposes.

A file version control system (VCS) is a program designed to handle a plurality of versions of one or more files. To allow automatic updating of documentation of a plurality of source files, some embodiments described herewithin propose documenting a marked segment of a version of a source file managed by a VCS using a source documentation object comprising a copy of the marked segment. Optionally, the source documentation object comprises a textual description associated with the marked segment. Optionally, the version of the source file is one of a plurality of versions of the source file, managed by the VCS. When a new version of the source file is identified in the VCS, in such embodiments an updated segment in the new version, equivalent to the marked segment, is classified as one of a set of change classifications and an updated source documentation object is optionally generated by modifying the copy of the marked segment according to the change classification and one or more differences identified between the updated segment and the copy of the marked segment. Some examples of a change classification are "no change", "change to context", "change to an inner block", and "non-updatable changes". Optionally, the updated source documentation object is generated subject to the change classification being a member of a set of updatable changes, for example "change to an inner block". Optionally, classifying the updated segment as one of the set of change classifications is according to the one or more differences between the updated segment and the copy of the marked segment. Modifying the copy of the marked segment according to the change classification increases accuracy of the updated source documentation object compared to generating the updated source documentation object using other methods that apply generic modifications, not adjusted according to the change classification, for example methods that generate syntactic documentation.

Optionally, the source documentation object is associated with the version of the source file comprising the marked segment. Optionally, the updated source documentation object is associated with the new version of the source file, comprising the updated segment equivalent to the marked segment of the version of the source file. Using a VCS to manage the source file allows using one or more VCS values to identify the version of the source file and distinguish the version of the source file from the new version of the source file, for example a respective checksum value associated with each of the source file's plurality of versions. Using the one or more VCS values to identify the version of the source file facilitates using existing development resources, reducing cost of implementation and ease of use of the method described above compared to other methods that rely on proprietary means of associating a version of documentation with a version of a source file. Associating the source documentation object with the version of the source file allows annotating the version of the source file with at least part of the source documentation object, for example in a development environment, for example by displaying at least part of the copy of the marked segment and additionally or alternatively at least part of the textual description associated with the marked segment as an annotation to the marked segment. Similarly, associating the updated source documentation object with the new version of the source file allows annotating the new version of the source file with at least part of the updated source documentation object, increasing accuracy of automatic annotation of each version of the file. Increasing accuracy of automatic annotation of each version of the file increases usability of a development system using the plurality of versions of the plurality of files, for example by increasing legibility of the plurality of versions of the plurality of source files to a human user of the development system.

Optionally, the source documentation object is one of a plurality of source documentation objects, each documenting one of a plurality of marked segments, each marked segment comprising at least part of one of a plurality of versions of one of the plurality of source files. Optionally, the source documentation object does not document a marked segment in one of the plurality of versions of the plurality of source files and does not contain a copy of the marked segment. Optionally, the source documentation object documents the entire version of the source file, i.e. the marked segment comprises the entire version of the source file. When the source documentation object documents the entire version of the source file, optionally the source documentation object comprises a link to the version of the source file instead of the marked segment. Optionally, the source documentation object is not associated with an identified version of an identified source file of the plurality of source files.

As used herewithin, the term "patch" refers to a plurality of differences between two versions of a file organized in a format that describes how to modify one version of the file in order to produce another version of the file. Thus, the term "applying a patch", as used herewithin, refers to applying the one or more changes to the one version of the file in order to produce the other version of the file.

When a file is organized in a plurality of lines, one common format for describing a plurality of differences between a first version and a second version of the file is the context format. In the context format, any changed lines of the second file are shown alongside some unchanged lines before and after, providing a context to the plurality of differences. Such a context serves as a reference to locate in the first file a location for one or more changes to be applied in order to produce the changed lines of the second file. A patch file may be organized in a plurality of hunks, each hunk describing a location in the first file identified by one or more line numbers of the first file and comprising one or more lines of the first version, and an equivalent location in the second file identified by one or more other line numbers of the second file and comprising one or more new lines of the second version. In the context format, the one or more lines of the first version comprise one or more unchanged lines that are the same in both the first file and the second file, and additionally or alternatively one or more removed lines each preceded by a token indicating the line is a line removed from the first version and additionally or alternatively one or more updated lines each preceded by a token indicating the line is a line modified in the second version. In addition, in the context format the one or more lines of the second version comprise the one or more unchanged lines that are the same in both the first file and the second file, and additionally or alternatively one or more added lines each preceded by a token indicating the line is a new line added to the second version and additionally or alternatively one or more new updated lines each preceded by a token indicating the line is a new line modified in the second version from a line of the first version.

Another existing format for describing the plurality of differences between the first version and the second version is the unified differences format. Similar to the context format, in the unified differences format a patch file may be organized in a plurality of hunks, each hunk describing a location in the first file identified by one or more line numbers of the first file, and an equivalent location in the second file identified by one or more other line numbers of the second file. However, in the unified differences format there is no indication of a modified line, and instead a plurality of consecutive modified lines is represented by two changes presented immediately adjacent—removal of a plurality of lines from the first version and addition of a plurality of new lines to the second version.

It is common practice to organize a patch in the unified differences format. To apply such a patch to a file, for each hunk of the plurality of hunks the file must comprise one or more file lines that are equal to the one or more lines of the first file. In some cases, the one or more file lines must be at a file location in the file, the file location identified by the one or more line number in the first file. In such cases, when the file has at the file location one or more file lines that are different from the one or more lines of the first file, the patch cannot be applied as the file is different from the first file.

In some embodiments, the present disclosure additionally proposes organizing the copy of the marked segment as a documentation patch instructing removal of the marked segment from the version of the source file. Such a documentation patch describes one or more documentation line changes between the version of the source file and a virtual file created by removing the marked segment from the version of the source file. Successfully applying such a documentation patch to another version of the source file is indicative of the marked segment being unchanged in the other version of the source file. Thus, in such embodiments, the present disclosure proposes identifying the copy of the marked segment is different from the updated segment subject to a failure to apply the copy of the marked segment as a patch to the new version of the source file. Optionally, applying the copy of the marked segment as a patch is by executing a patch method of the VCS. Using a patch method of the VCS reduces complexity of a system compared to using a proprietary compare method, thus increasing usability.

In addition, it may be the case that after the version of the source file was added to the VCS, more than one other version of the source file was added to the VCS, each at a time of addition to thereof. In some embodiments, the present disclosure additionally proposes organizing the more than one other version in a sequence of versions of the source file, in ascending order of the respective time of addition to the VCS thereof, and generating the updated source documentation object in a plurality of iterations. Optionally, in each of the plurality of iterations the updated source documentation object is generated using a consecutive version of the source file, immediately following the version of the source file in the sequence of the versions of the source file. Optionally, the consecutive version of the source file is used as the source file in a next iteration of the plurality of iterations, and the updated documentation object is used as the source documentation object in the next iteration. Generating the updated documentation object in a plurality of iterations increases a likelihood of the change classification being a member of the set of updateable changes and thus increases a likelihood of automatically updating the copy of the marked segment, increasing usability of a system implemented according to the present disclosure.

In addition, the present disclosure proposes in some embodiments described herewithin, to compute the change classification by analyzing a plurality of line-change classifications, each classifying the one or more documentation line changes as described by the copy of the marked segment of the documentation patch. Computing the change classification by analyzing the plurality of line-change classifications increases accuracy of the change classification compared to analyzing the updated segment as a monolithic block.

For example, a change to an inner block may be one or more changes to a marked segment organized in a plurality of lines where none of the one or more changes are in a first line of the marked segment or in a last line of the marked segment. In this example, a change classification of "change to an inner block" may be determined when identifying that a first and last lines of the copy of the marked segment are respectively equal to the first and last lines of the updated segment. When the one or more differences between the updated segment and the copy of the marked segment are in one or more lines that are not the first or last lines of the copy of the marked segment or the updated segment, there is an increased likelihood that a textual description associated with the marked segment is relevant to the updated segment, and thus the updated source documentation object may be generated using the textual description and the updated segment.

In another example, after determining the change classification is not "change to an inner block", a change classification of "updatable single line change" may be determined when identifying the one or more differences comprise one or more token differences to an amount of tokens of one line of the copy of the marked segment. When an amount of the one or more token differences is below an identified threshold, there is an increased likelihood that the textual description associated with the marked segment is relevant to the updated segment, and thus the updated source documentation object may be generated using the textual description and the updated segment.

In addition, in some embodiments described herewithin, the textual description comprises one or more text-extracts, each text-extract comprising one or more marked tokens extracted from one of the plurality of versions of the plurality of source files. In such embodiments the present disclosure proposes updating the textual description by accessing a new version of the source file from which at least one of the one or more marked tokens was extracted and performing an identification of when at least one updated token in the new version of the source file, which is equivalent to the at least one marked token, is different from the at least one marked token. Optionally, in response to the identification, the at least one updated token is classified as one of the set of change classifications. Optionally, the at least one updated token is classified according to one or more differences identified between the at least one updated token and the at least one marked token. Optionally, the one or more text-extracts in the textual description are modified according to the change classification and the one or more differences. Optionally, one or more text-extracts are modified subject to the change classification being a member of the set of updatable changes. Optionally, the source documentation object is generated by modifying the one or more text-extracts in the textual description. Performing an identification of when the at least one updated token is different from the at least one marked token and classifying the at least one updated token as one of the set of change classifications facilitates automatic generation of the updated source documentation when the source documentation object comprises text extracted from a source file, increasing accuracy of the textual description in the updated source documentation object. Increasing accuracy of the textual description increases usability of a development system using the plurality of versions of the plurality of files, for example by accurately describing part of the plurality of versions of the plurality of source files to a human user of the development system.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

For brevity, henceforth the term "documentation object" is used to mean "source documentation object", and the terms are used interchangeably.

Figure 1:
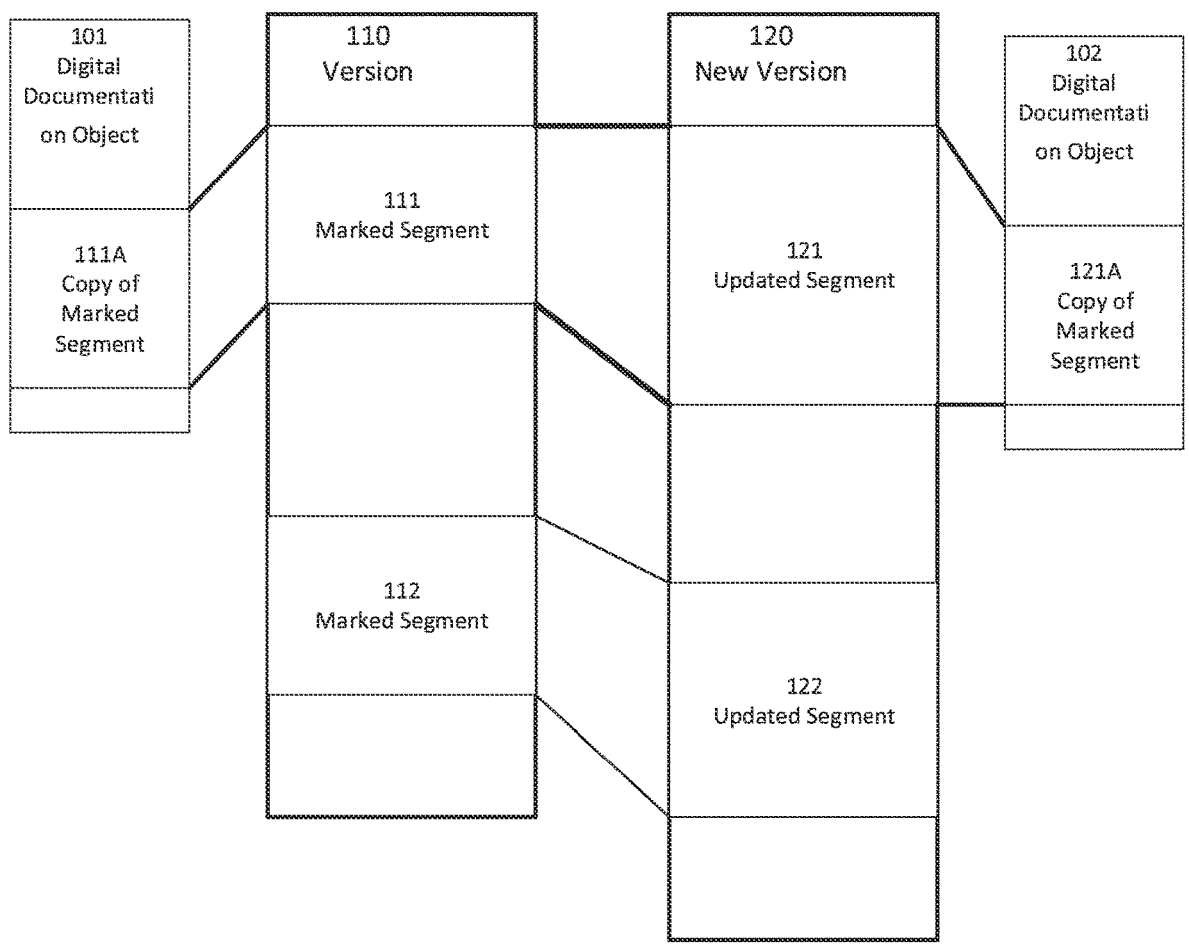
FIG. 1 is a schematic block diagram of exemplary documentation, according to some embodiments.

Reference is now made to FIG. 1, showing a schematic block diagram of exemplary documentation 100, according to some embodiments. In such embodiments, a version of a source file 110 comprises one or more marked segments, for example marked segment 111 and marked segment 112. Optionally, source documentation object 101 documents marked segment 111. Optionally, documentation object 101 comprises a copy of marked segment 111A. When version of the source file 110 is organized in a plurality of lines, the copy of marked segment 111A optionally comprises one or more documentation line changes between the version of the source file and a virtual file created by removing marked segment 111 from version of the source file 110. When marked segment 111 is the entire version of the source file 110, the copy of marked segment 111A optionally comprises a reference to version of the source file 110. Optionally, the copy of marked segment 111A is formatted in unified differences format. Optionally, copy of marked segment 111A comprises one or more unmarked documentation lines preceding, and additionally or alternatively following, marked segment 111 in version of the source file 110.

Optionally, documentation object 101 is one of a plurality of documentation objects, each documenting another marked segment of a plurality of marked segments. For example, another of the plurality of documentation objects may document marked segment 112. Yet another of the plurality of documentation objects may document yet another marked segment, in another file other than the version of the source file 110.

Optionally, new version of the source file 120 is an updated version of version of the source file 110. Optionally, new version of the source file 120 comprises updated segment 121 which corresponds to, i.e. is equivalent to, marked segment 111 of version of the source file 110. Optionally, new version of the source file 120 comprises one or more other updated segments, for example updated segment 122 corresponds to, i.e. is equivalent to, marked segment 112 of version of the source file 110. Optionally, updated segment 122 is located at a line number in new version of the source file 120, different from another line number in version of the source file 110 where marked segment 112 is located therein. Optionally, updated segment 121 is different from marked segment 111. Optionally, new version of source file 120 comprises one or more unchanged documentation lines preceding, and additionally or alternatively following, updated segment 121. Optionally, new version of source file 120 comprises one or more other changed documentation lines preceding, and additionally or alternatively following, updated segment 121.

Optionally, documentation object 101 is not relevant to updated segment 121, for example when documentation object 101 is outdated with respect to updated segment 121. In such embodiments, an updated documentation object 102 is generated, documenting updated segment 121. Optionally, documentation object 102 comprises a copy of updated segment 121A. Optionally, copy of updated segment 121A comprises the one or more unchanged documentation lines preceding, and additionally or alternatively following, updated segment 121. Optionally, copy of updated segment 121A comprises the one or more other changed documentation lines preceding, and additionally or alternatively following, updated segment 121.

Figure 2:
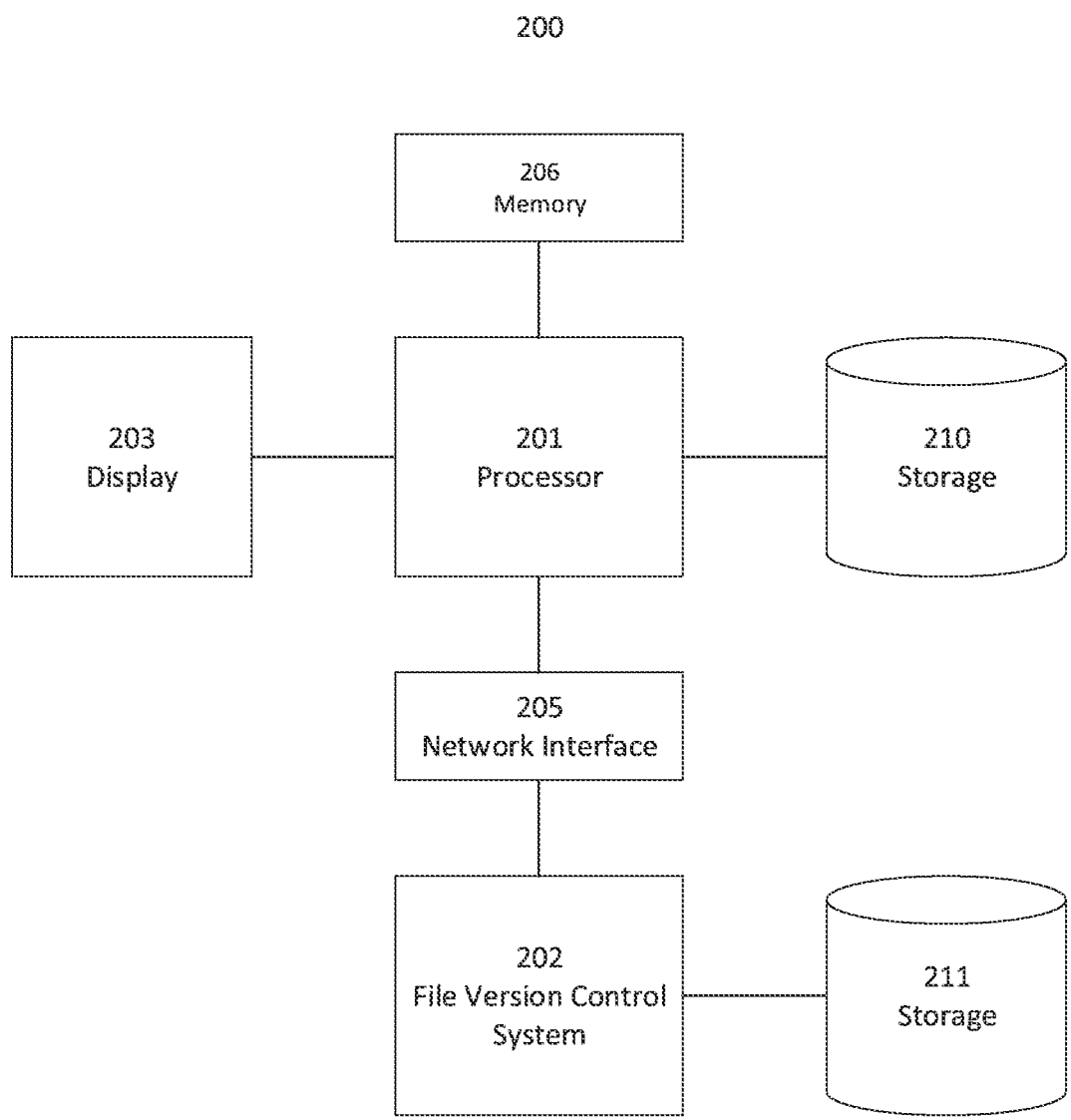
FIG. 2 is a schematic block diagram of an exemplary apparatus, according to some embodiments.

Reference is now made also to FIG. 2, showing a schematic block diagram of an exemplary apparatus 200, according to some embodiments. In such embodiments, apparatus 200 comprises at least one hardware processor 201 connected to file version control system (VCS) 202. Optionally, VCS 202 is a program executed by at least one other hardware processor, optionally connected to at least one hardware processor 201 via one or more digital communication network interface 205. Optionally, VCS 202 is a program executed by at least one hardware processor 201. Some examples of a VCS are git, Concurrent Versions System (CVS), Apache Subversion (SVN), PVCS Version Manager, IBM Rational, Visual SourceSafe, and Google Drive file versioning.

Optionally, one or more digital communication network interface 205 is connected to a local area network (LAN), for example an Ethernet network or a wireless network. Optionally, one or more digital communication network interface 205 is connected to a wide area network (WAN), for example the Internet.

For brevity, henceforth the term "processing unit" is used to mean "at least one hardware processor" and the terms are used interchangeably.

Optionally, processing unit 201 is connected to memory 206, optionally storing program instructions. Optionally, memory 206 is a non-transitory computer readable storage medium, for example a read only memory (ROM). Optionally, memory 206 is a transitory computer readable storage medium, for example a random access memory (RAM).

Optionally, VCS 202 is connected to one or more non-volatile storage 211, optionally for the purpose of storing a plurality of versions of a plurality of source files managed by VCS 202. Some examples of a non-volatile storage are a hard disk drive (HDD), a solid state drive (SSD), a networked storage and a network connected storage. Optionally, processing unit 201 is connected to one or more non-volatile storage 210, optionally for the purpose of storing a plurality of source documentation objects each documenting one of a plurality of marked segments each from one of the plurality of versions of the plurality of source files. Optionally, one or more non-volatile storage 210 is one or more non-volatile storage 211.

Optionally, processing unit 201 is connected to at least one display device 203, optionally for the purpose of displaying one or more of the plurality of documentation objects. Some examples of a display device are a computer screen, a smartphone screen and a monitor.

Optionally, apparatus 200 is a development environment, for example a software development environment. Optionally, the one or more of the plurality of documentation objects are displayed on at least one display device 203 as annotation of one or more of the plurality of versions of the plurality of source files displayed on at least one display device 203, for example when apparatus 200 is a development environment.

In some embodiments described herewithin, apparatus 200 implements the following method, optionally executed, at least in part, by processing unit 201.

Figure 3:
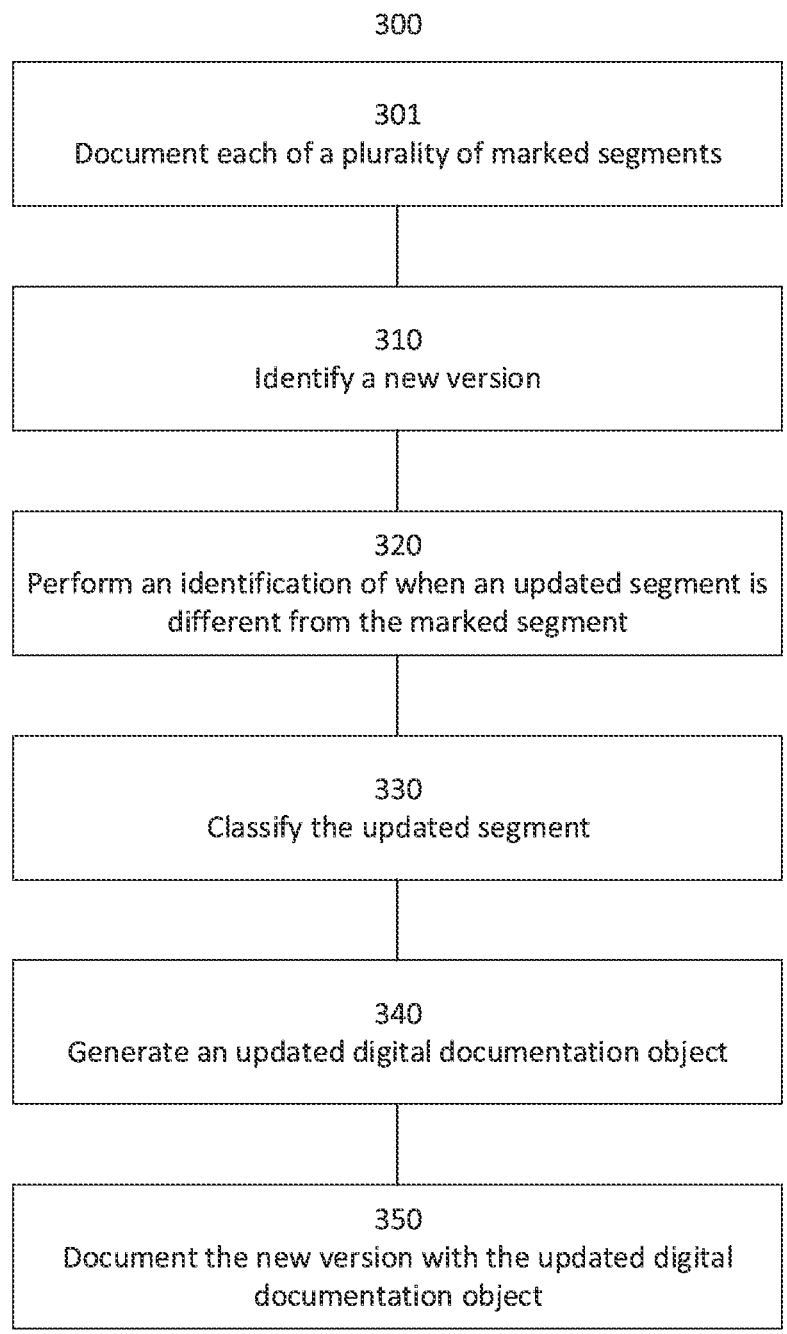
FIG. 3 is a flowchart schematically representing an optional flow of operations for updating documentation, according to some embodiments.

Reference is now made also to FIG. 3, showing a flowchart schematically representing an optional flow of operations 300 for updating documentation, according to some embodiments. In such embodiments, processing unit 201 executes flow of operations 300. Optionally, in 301 processing unit 201 documents each of a plurality of marked segments in one of a plurality of source documentation objects. Optionally, each marked segment comprises at least part of one of a plurality of versions of one of a plurality of source files. In one example, the plurality of source files is a plurality of software program source files. Optionally, at least one of the plurality of source files is formatted according to a schema, for example a HyperText Markup Language (HTML) schema, or a schema of a test procedure. Optionally, each documentation object comprises a copy of the marked segment the documentation object documents.

Optionally, the plurality of source documentation objects is organized in at least one documentation file. Optionally, each of the at least one documentation file has a plurality of documentation versions. Optionally, the plurality of documentation versions of the at least one documentation file is managed by another VCS. Optionally, the other VCS is VCS 202. Optionally, each documentation version of the at least one documentation file in the other VCS is associated with a version of at least one of the plurality of source files. Optionally, a set of documentation entries documenting one version of a source file are organized in one documentation file, optionally using a table. Optionally, each documentation object comprises additional metadata, optionally describing the version of the respective source file documented thereby and additionally or alternatively describing the marked segment documented thereby. For example, when each of the plurality of versions of the source file is associated with a digital signature value, a documentation object may comprise the digital signature value associated with the version of the source file documented thereby. Optionally, the digital signature value is a checksum value, optionally computed using a secure hash algorithm (sometimes known as a SHA value of the version of the source file), a textual description of the marked segment, and a path of the source file of the version of the source file when the plurality of source files is organized in a file directory. Optionally, the digital signature value is a checksum value computed for a plurality of versions of a plurality of source files modified in VCS 202 at an identified time, known also as a commit to VCS 202.

Reference is now made again to FIG. 1. For brevity, henceforth the term "version 110" is used to refer to version of source file 110, and the term "version 120" is used to refer to new version of source file 120, and the terms are used interchangeably respectively.

Reference is now made again to FIG. 3. Optionally, the plurality of source files is managed by VCS 202. For example, VCS 202 may manage, among other files, version of source file 110. In 310, processing unit 201 optionally identifies a new version of a source file of the plurality of source files, for example new version 120. Optionally, new version 120 was added to VCS 202 after version 110 had been added thereto. Optionally, processing unit 201 retrieves version 110 and additionally or alternatively version 120 from VCS 202.

In 320, processing unit 201 optionally performs an identification of when updated segment 121 in new version 120 is different from marked segment 111, where updated segment 121 is equivalent to marked segment 111. Optionally the source file that version 110 and new version 120 are one of a plurality of versions thereof is organized in a plurality of lines. To perform the identification, processing unit 202 optionally computes a mapping between a plurality of line numbers of marked segment 111 in version 110 and a plurality of other line numbers of updated segment 122 in version 120.

In some embodiments, processing unit 201 identifies updated segment 121 is different from marked segment 111 by applying documentation line changes. In such embodiments, processing unit 201 optionally executes the following optional method.

Figure 4:
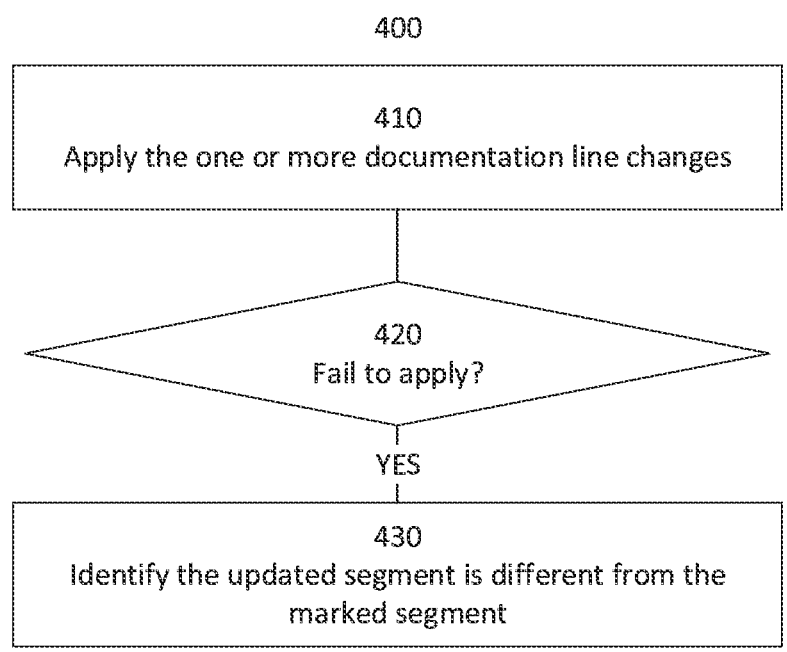
FIG. 4 is a flowchart schematically representing another optional flow of operations, according to some embodiments.

Reference is now made also to FIG. 4, showing a flowchart schematically representing another optional flow of operations 400, according to some embodiments. In such embodiments, in 410 processing unit 201 applies a plurality of documentation line changes of copy of marked segment 111A to new version 120. Optionally, processing unit 201 applies the plurality of documentation line changes using a patch application method of VCS 202, for example git-apply when VCS 202 is a git VCS. Optionally, processing unit 201 identifies updated segment 121, equivalent to marked segment 111, when applying the plurality of documentation line changes to new version 120.

In 420, processing unit 201 optionally identifies a failure to apply the plurality of documentation line changes to new version 120. Optionally, processing unit 201 uses the failure to identify in 430 that updated segment 121 is different from marked segment 111.

In software development, the term "lint" refers to static software analysis of source code for programmatic and stylistic errors. As used herein, the terms "delint" and "applying lint" refer to removal from a text of one or more characters that do not change semantics of the text and thus may be ignored when comparing to another text for purposes of documentation. The term "lint characters" refers to such characters that do not change semantics of the text. Some examples of a lint character are a semicolon, a comma, a space, a new line character, a tab character, a form feed character, a carriage return character, and a vertical tab character. In some cases, applying lint to a text comprises replacing single quotes by double quotes or by back-quotes. In some other cases, applying lint to a text comprises replacing double quotes by single quotes or by back-quotes. In yet some other cases, applying lint to a text comprises replacing back-quotes by single quotes of back double quotes.

Reference is now made again to FIG. 3. In response to the identification in 320, in 330 processing unit 201 optionally classifies updated segment 121 as one of a set of change classification. Some examples of a change classification include, but are not limited to: "change to lint-characters", "change to an inner block", "updatable single line change", "no change", "change to context", and "non-updatable change". Optionally, some change classifications indicate an ability to automatically update related documentation. Some examples of updatable changes include, but are not limited to, "change to lint-characters", "change to an inner block", and "updatable single line change".

Optionally processing unit 201 classifies updated segment 121 according to one or more differences identified between updated segment 121 and copy of marked segment 111A.

Figure 5A:
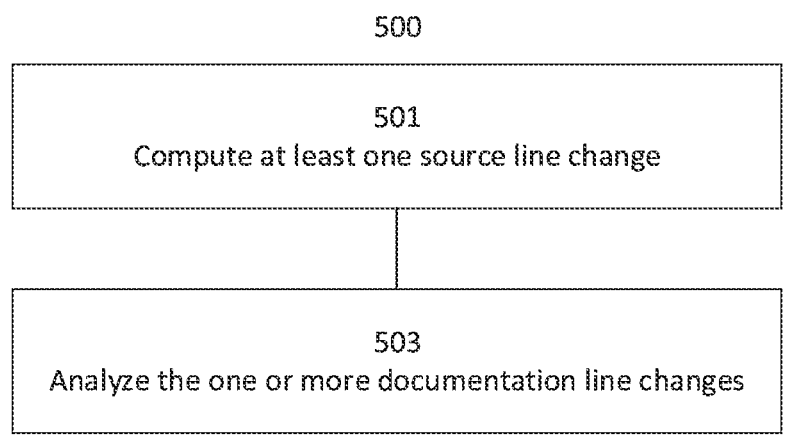
FIGS. 5A and 5B are flowcharts schematically representing optional flows of operations for classification, according to some embodiments.

Reference is now made also to FIG. 5A, showing a flowchart schematically representing an optional flow of operations for classification 500, according to some embodiments. In such embodiments, to classify updated segment 121, in 501 processing unit 201 computes one or more source line changes between new version 120 and version 110. Optionally, to compute the one or more source line changes, processing unit 201 computes a mapping between a plurality of line numbers of marked segment 111 in version 110 and another plurality of line numbers of updated segment 121 in version 120. Optionally, processing unit 201 computes the one or more source line changes by applying a compare method, for example Myers Diff algorithm. Optionally, the compare method is executed via VCS 202. Optionally, in 503, processing unit 201 computes the change classification by analyzing the one or more documentation line changes of copy of marked segment 111A and the one or more source line changes to identify the one or more differences between updated segment 121 and copy of marked segment 111A.

Figure 5B:
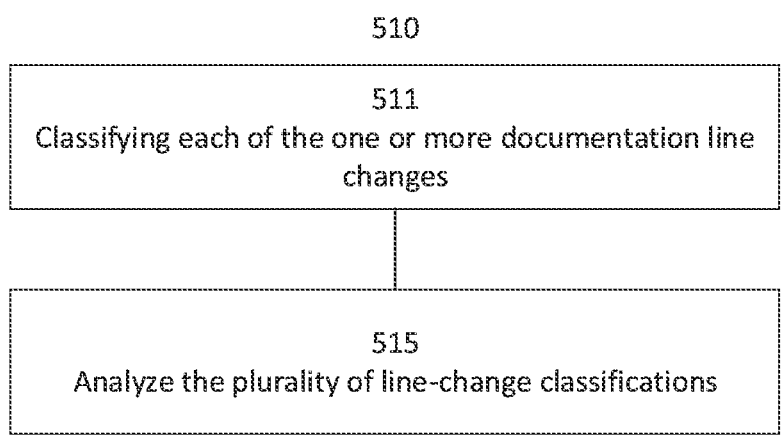

Reference is now made also to FIG. 5B, showing a flowchart schematically representing another optional flow of operations for classification 510, according to some embodiments. In such embodiments, in 511 processing unit 201 classifies each of the one or more documentation line changes as one of a set of line-change classifications. Some examples of a line-change classification are: ADDITION, DELETION, UPDATE, CONTEXT, and NO CHANGE. Optionally, in 511 processing unit 201 analyzes the one or more documentation line changes and the one or more source line changes to identify the one or more differences between updated segment 121 and copy of marked segment 111A, to produce a plurality of line-change classifications.

In 515, processing unit 201 optionally computes the change classification by analyzing the plurality of line-change classifications.

Optionally, before classifying updated segment 121 processing unit 201 generates a dynamic patch file using a set of description objects documenting one or more marked segments in file version 110. Optionally, the dynamic patch file comprises an array of hunk containers, each computed using one of the set of description objects and organizing one or more of: the plurality of line-change classifications, the one or more documentation line changes, and the one or more source line changes.

Reference is now made again to FIG. 3. In 340, processing unit 201 optionally generates updated source documentation object 102. Optionally, processing unit 201 generates updated source documentation object 102 subject to the change classification computed in 330 being a member of a set of updateable changes. Optionally, processing unit 201 generates updated documentation object 102 by modifying copy of marked segment 111A according to the changes classification and the one or more differences.

Optionally, 330 and 340 are combined, and copy of marked segment 111A is modified while classifying updated segment 121. Reference is now made also to FIG. 6A, showing pseudo-code representing an optional flow of operations 600 for modifying documentation, according to some embodiments. As used in henceforth, the term "inner context" refers to one or more lines of copy of marked segment 111A which are changed in updated segment 121 and each comprise at least one character that is not a whitespace character. In addition, as used henceforth, the terms "side A" and "side B" refer respectively to item A and item B of a file comparison method, for example, Myer Diff Algorithm. Optionally, side A refers to version 110 and side B refers to updated version 120. In such embodiments, method 600 is used when classifying updated segment 121 as "change to lint-characters". Optionally, analyzing the plurality of line-change classifications comprises applying lint to copy of marked segment 111A and the one or more source line changes, optionally producing copy of updated segment 121A, optionally for producing updated documentation object 102.

Reference is now made also to FIG. 6B, showing pseudo-code representing another optional flow of operations 610 for modifying documentation, according to some embodiments. In such embodiments, method 610 is used when classifying updated segment 121 as "change to an inner block". Optionally, analyzing the plurality of line-change classifications comprises replacing one or more lines of copy of marked segment 111A with one or more other lines of updated segment 121, optionally producing copy of updated segment 121A, optionally for producing updated documentation object 102.

Reference is now made also to FIG. 6C, showing pseudo-code representing yet another optional flow of operations 620 for modifying documentation, according to some embodiments. In such embodiments, method 620 is used when classifying updated segment 121 as "updatable single line change". Optionally, analyzing the plurality of line-change classifications comprises replacing one line of copy of marked segment 111A with an equivalent line of updated segment 121, optionally producing copy of updated segment 112A, optionally for producing updated documentation object 102. Optionally, method 620 is applied after failing to classify updated segment 121 as "change to an inner block".

Reference is now made again to FIG. 3.

Optionally, generating updated documentation object 102 additionally, or alternatively, comprises processing unit 201 modifying copy of marked segment 111A according to the one or more unchanged documentation lines preceding, and additionally or alternatively following, updated segment 121. Optionally, generating updated documentation object 102 additionally, or alternatively, comprises processing unit 201 modifying copy of marked segment 111A according to the one or more other changed documentation lines preceding, and additionally or alternatively following, updated segment 121.

Optionally, generating updated documentation object 102 additionally, or alternatively, comprises processing unit 201 modifying one or more line numbers of copy of marked segment 111A in version 110 according to one or more other line numbers of updated segment 121 in version 120.

It may be that a source file's name was changed. Optionally, classifying updated segment 121 comprises identifying a file name of new version 120 is different from another file name of version 110, i.e. identifying a rename. Optionally, identifying the file name of new version 120 is different from the other file name of version 110 comprises identifying a plurality of removed files removed from VCS 202 and a plurality of added files added to VCS 202. Optionally, identifying the rename further comprises organizing the plurality of removed files and the plurality of added files in pairs, each comprising one of the plurality of added files and one of the plurality of removed files. Optionally, identifying the rename further comprises computing a plurality of similarity scores, one for each pair, and indicative of a degree of similarity between the pair. Optionally, a pair having a similarity score exceeding a threshold similarity score is considered a rename of a file.

It may be that the source file was moved in a file directory according to which the plurality of source files is organized. Optionally, classifying updated segment 121 comprises identifying a file path of new version 120 is different from another file path of version 110. When source documentation object 101 comprises the other file name of version 110 and additionally or alternatively the other file path of version 110, updated documentation object 102 is optionally modified using the file name of version 120 and additionally or alternatively the file path of version 120.

Optionally, documentation object 101 comprises a textual description describing marked segment 111. Reference is now made also to FIG. 7, showing a flowchart schematically representing an optional flow of operations 700 for updating documentation text, according to some embodiments. In such embodiments, in 701 processing unit 201 identifies one or more tokens present in the textual description. Optionally, processing unit 201 identifies the one or more tokens in the one or more differences identified between updated segment 121 and copy of marked segment 111A. For example, when the source file is a source code file of a software program, a token may be a function name or a name of an argument of a function. Optionally, a token is a file name or a module name. In 703, processing unit 201 optionally identifies in the one or more differences one or more updated tokens, equivalent to the one or more tokens identified in 701. Optionally, to identify the one or more updated tokens, processing unit 201 links at least one filename identified in the documentation text with an object describing a version of the plurality of versions of the source file. Optionally, when a source file is renamed, processing unit 201 updates the object according to a new filename of the source file. In 705, processing unit 201 optionally generates updated documentation object 102 by replacing in the textual description the one or more tokens with the one or more updated tokens.

Reference is now made again to FIG. 3.

When the change classification is "non-updatable change", processing unit 201 optionally generates updated documentation object 102 using copy of marked segment 111A and by marking copy of marked segment 111A as obsolete, optionally in updated documentation object 102.

When the change classification is "no change" or "change to context", processing unit 201 optionally generates updated documentation object 102 using copy of marked segment 111A. Optionally, processing unit 201 associates documentation object 101 with new version 120.

In 350, processing unit 201 optionally documents new version 120 with updated source documentation object 102, for example by adding to updated documentation object 102 a new digital signature value computed using new version 120.

Optionally, processing unit 201 identifies in VCS 202 one or more other new versions of the source file of version 110, where each of the one or more other new versions was added to VCS 202 after version 110 and before new version 120.

Optionally, processing unit 201 produces a sequence of versions of the source file by organizing the one or more other new versions in ascending order of addition to the VCS. Optionally, processing unit 201 generates updated documentation object 102 in a plurality of iterations, each time using two consecutive files in the sequence of versions. Optionally, in each of the plurality of iterations, processing unit 201 repeats 320, 330 and 340, using a consecutive version of the source file, immediately following version 110 in the sequence of versions, as new version 120 in a first iteration of the plurality of iterations. Optionally, in each of the plurality of iterations, processing unit 201 uses the consecutive version as version 110 in a next iteration of the plurality of iterations. Optionally, in each of the plurality of iterations, processing unit 201 uses updated source documentation object 102 as documentation object 101 in the next iteration.

In some embodiments, a software program product comprises memory 206 storing program instructions for executing method 300. Optionally, processing unit 201 executes the program instructions from memory 206. Optionally, the software program product is a plug-in module for an integrated development environment (IDE).

Reference is now made also to FIGS. 8A and 8B, showing exemplary screenshots of a development environment, according to some embodiments. With reference to FIG. 8A, in such embodiments, when a user selects one or more versions of one or more source files, screenshot 800 is displayed to show marked segment 801, marked segment 802 and marked segment 803 of the one or more versions of the one or more source files. Optionally, marked segment 801, marked segment 802 and marked segment 803 are from one version of one source file. Optionally, screenshot 800 is displayed on display 203, optionally by processing unit 201. Optionally, a first source documentation object associated with marked segment 801 comprises documentation text 820, in this example including the text "In this step we define the value in config.py". Optionally, processing unit 201 displays documentation text 820 as an annotation to marked segment 801. Optionally, indication 810 shows that the first source documentation object is up-to-date and relevant to marked segment 801.

Similarly, indication 811 optionally shows that a second source documentation object, associated with marked segment 802, is up-to-date and relevant to marked segment 802. Further similarly, indication 812 optionally shows that a third source documentation object, associated with marked segment 803, is up-to-date and relevant to marked segment 803.

When one or more new versions of the one or more source files are available, processing unit 201 optionally executes method 300. For example, in the one or more new versions marked segment 801 may be modified to produce updated segment 801A and marked segment 803 may be modified to produce updated segment 803A. Optionally marked segment 802 is unmodified. Optionally, an outcome of executing method 300 is a first updated source documentation object associated with updated segment 801A comprising an indication of a failure to automatically update the documentation. Optionally, another outcome of executing method 300 is a second updated source documentation object associated with marked segment 802 comprising a copy of marked segment 802 copied from the second source documentation object, and a third updated source documentation object associated with updated segment 803A comprising an indication that third updated source documentation object comprises a copy of updated segment 803A, automatically generated by execution of method 300.

With reference to FIG. 8B, after execution of method 300, in such embodiments when the user selects the one or more new versions of the one or more source files, screenshot 800A is displayed to show updated segment 801A, marked segment 802 and updated segment 803A of the one or more new versions of the one or more source files. Optionally, indication 810 now shows that the first updated source documentation object is no longer up-to-date with reference to updated segment 801.

On the other hand, in screenshot 800A indication 811 optionally shows that the second updated source documentation object, associated with marked segment 802, is up-to-date and relevant to marked segment 802. In addition, in screenshot 800A, indication 812 optionally shows that the third updated source documentation object, associated with marked segment 803, was automatically generated and is up-to-date and relevant to updated segment 803A. It should be noted that in this example a change in line number between marked segment 803 and updated segment 803A does not prevent automatic generation of the third updated source documentation object to be up-to-date and relevant to updated segment 803A. In addition, in this example a change in file name does not prevent automatic generation of the third updated source documentation object to be up-to-date and relevant to updated segment 803A.

In some embodiments where the source documentation comprises a textual description, the textual description comprises one or more text-extracts. Optionally, each text-extract comprises one or more marked tokens extracted from one of the plurality of versions of the plurality of source files. In such embodiments, apparatus 200 may implement the following method, additionally or alternatively to implementing method 300. Optionally the following method is executed, at least in part, by processing unit 201.

Reference is now made also to FIG. 9, showing a flowchart schematically representing an optional flow of operations 900 for updating a textual description, according to some embodiments. In such embodiments, in 901 processing unit 201 documents the plurality of versions of the plurality of source files in the plurality of source documentation objects, where one or more of the plurality of source documentation objects comprises a textual description. Optionally, the textual description comprises one or more text-extracts, each text extract comprising one or more marked tokens extracted from one of the plurality of versions of the plurality of source files. Some examples of a marked token are a software program identifier, a delimiter character, a sequence of characters depicting a word in a natural language, and a natural language delimiter character. A software program identifier may comprise a sequence of characters according to a syntax of a programming language of the software program, for example comprising alphanumeric characters and an underscore, for example used as a name of a variable or of a function. A delimiter character may be selected from a set of delimiter characters of the programming language of the software program, for example a white-space character, a bracket, a character denoting an arithmetic operation, and a semi-colon. A natural language delimiter character may be according to a natural language syntax of the natural language, for example a white-space character, an underscore and a comma.

Optionally, the source documentation object is associated with an identified source file of the plurality of source files. Optionally, the one or more marked tokens are extracted from a version of the identified source file. When the source documentation object documents a segment of the identified source file, the one or more marked tokens may be extracted from the segment. Optionally, the one or more marked tokens are extracted from another part of the identified source file, not the segment documented by the source documentation object. Optionally, the one or more marked tokens are extracted from another version of another source file, different from the identified source file. Optionally, the source documentation object is not associated with any of the plurality of source files.

In 910, processing unit 201 optionally accesses a new version of a source file of the plurality of source files. Optionally, when at least one of the one or more text-extracts of the textual description are extracted from a version of a source file, the new version is newer than the version of the source file from which the at least one text-extract was extracted. When the plurality of source files is managed by VCS 202, in 910 processing unit 201 optionally identifies the new version in VCS 202. Optionally, the new version was added to VCS 202 after the version of the source file from which the at least one text-extract was extracted.

Optionally, the source file is organized in a plurality of lines. Optionally, the at least one text-extract is at least part of one line of the plurality of lines of the version of the source file. In 912, processing unit 201 optionally identifies in the new version of the source file an equivalent line that is equivalent to the one line of the plurality of lines of the version of the source file, that is the one line from which the at least one text-extract was extracted. Optionally, processing unit 201 identifies more than one line equivalent to the one line.

Reference is now made also to FIG. 10A, showing a flowchart schematically representing an optional flow of operations 1000A for identifying an equivalent line, according to some embodiments. Optionally, method 1000A is executed by processing unit 201 in 912. In such embodiments, in 1001 processing unit 201 computes a plurality of line matches between a respective plurality of lines of the version of the source file and another respective plurality of lines of the new version of the source file. Optionally, in 1005, processing unit 201 identifies a line match of the plurality of line matches where the line match comprises the one line.

Reference is now made again to FIG. 9. In 915, processing unit 201 optionally performs an identification of when one or more updated tokens in the new version of the source file are different from the one or more marked tokens, where the one or more updated tokens are equivalent to the one or more marked tokens of the at least one text-extract.

Reference is now made also to FIG. 11, showing a schematic diagram showing an exemplary match 1100 between lines of text, according to some embodiments. In this example, the version of the source file comprises line 1120, which in turn comprises marked tokens 1121. In this example, line 1120 further comprises a plurality of context tokens including context tokens 1122 preceding marked tokens 1121, and context tokens 1123 following marked tokens 1121.

Further in this example, textual description 1110 comprises text-extract 1111, which comprises marked tokens 1121 from line 1120.

In this example, the new version of the source file comprises updated tokens 1121A which are equivalent to marked tokens 1121 in the version of the source file, and in 915 processing unit 201 identifies that equivalent tokens 1121A are different from marked tokens 1121.

In this example, the new version of the source file comprises equivalent line 1120A which comprises equivalent tokens 1121A, and in 1005 processing unit 201 identifies that equivalent line 1120A is equivalent to line 1120.

Reference is now made again to FIG. 9. Optionally, in 915 performing the identification of when the one or more updated tokens in the new version of the source file are different from the one or more marked tokens comprises identifying the one or more updated tokens in the equivalent line, for example identifying updated tokens 1121A in equivalent line 1120A. Optionally, performing the identification comprises searching for the one or more marked tokens in the new version of the source file. Optionally, performing the identification comprises identifying the one or more updated tokens in a line of the new version of the source file that is not equivalent to the one line from which the one or more marked tokens were extracted, for example when the one line or part of the one line were deleted from the new version of the source file compared to the version of the source file.

Reference is now made also to FIG. 10B, showing a flowchart schematically representing an optional flow of operations 1000B for matching tokens, according to some embodiments. Optionally, method 1000B is executed by processing unit 201 in 915. In such embodiments, in 1010 processing unit 201 computes a sequence of tokens of the one line. In 1020, processing unit 201 optionally computes a sequence of new tokens of the equivalent line. In 1030, processing unit 201 optionally computes a plurality of token matches between the sequence of tokens and the sequence of new tokens.

Optionally, computing the plurality of token matches comprises organizing the sequence of tokens in a sequence of token lines, each consisting of one of the sequence of tokens in order of the sequence of tokens. Optionally, computing the plurality of token matches comprises organizing the sequence of new tokens in a sequence of new token lines, each consisting of one of the sequence of new tokens in order of the sequence of new tokens. Optionally, computing the plurality of token matches comprises computing a plurality of token line matches between the sequence of token lines and the sequence of new token lines.

Reference is now made also to FIG. 12, showing a schematic block diagram showing an exemplary plurality of token matches 1200, according to some embodiments. In this example, sequence of tokens 1210 is a sequence of tokens of line 1120, organized in a plurality of token lines, and sequence of new tokens 1220 is a sequence of tokens of equivalent line 1120A, organized in a sequence of new token lines. For simplicity, this example only shows tokens that are alpha-numeric sequences of characters (words), however delimiters between words, such as spaces and other punctuation characters, may be additional tokens in the sequence of tokens 1210 and the sequence of new tokens 1220.

Further in this example, token matches 1230 are the plurality of token matches between sequence of tokens 1210 and sequence of new tokens 1220, computed in 1030, optionally by computing a plurality of token line matches between sequence of tokens 1210 and sequence of new tokens 1220. A token match of the plurality of tokens may comprise a token of the sequence of tokens, a new token of the sequence of new tokens, or both. For example, the first marked match 1231 comprises a token of sequence of tokens 1210 but no new token of the sequence of new tokens 1220.

Reference is now made again to FIG. 10B. In 1040, processing unit 201 optionally identifies one or more token matches of the plurality of token matches that are marked token matches, i.e. comprising the one or more marked tokens, and in 1050 processing unit 201 optionally identifies the one or more updated tokens in the one or more token matches. An amount of the one or more token matches comprising the one or more marked tokens may be different that an amount of one or more marked tokens, for example when a new token is inserted between two marked tokens, or when a marked token is removed from the one or more updated tokens.

Reference is now made again to FIG. 9. In 920, processing unit 201 optionally classifies the one or more updated tokens as one of a set of change classifications. Optionally, processing unit 201 classifies the one or more updated tokens according to one or more differences identified between the one or more updated tokens and the one or more marked tokens.

Optionally, classifying the one or more updated tokens comprises identifying in the sequence of tokens a plurality of context tokens. At least some of the plurality of context tokens may immediately precede the one or more marked tokens in the one line (henceforth, prefix context). At least some other of the plurality of context tokens may immediately follow the one or more marked tokens in the one line (henceforth suffix context). Reference is now made again to FIG. 11. In this example, classifying the one or more updated tokens comprises identifying in the sequence of tokens context tokens 1122 preceding marked tokens 1121 (henceforth prefix context 1122) and context tokens 1123 following marked tokens 1121 (henceforth suffix context 1123).

Reference is now made again to FIG. 9. Optionally, classifying the one or more updated tokens comprises identifying in the sequence of new tokens a plurality of equivalent context tokens. Optionally, the plurality of equivalent context tokens are identified according to the plurality of token matches. Reference is now made again to FIG. 11. In this example, classifying the one or more updated tokens comprises identifying in the sequence of new tokens equivalent context tokens 1122A preceding updated tokens 1121A (henceforth equivalent prefix tokens 1122A) and equivalent context tokens 1123A following updated tokens 1121A (henceforth equivalent suffix tokens 1123A). Optionally, equivalent prefix tokens 1122A and equivalent suffix tokens 1123A are identified according to token matches 1230. Optionally, a line may not comprise prefix context tokens and additionally or alternatively not comprise suffix context tokens. Optionally, the equivalent line may not comprise equivalent prefix tokens and additionally or alternatively not comprise equivalent suffix tokens, for example when the prefix content tokens or the suffix content tokens were deleted.

Reference is now made again to FIG. 9. Optionally, classifying the one or more updated tokens comprises computing a context similarity score that is indicative of a confidence level that the plurality of context tokens is similar to the plurality of equivalent context tokens. Optionally, classifying the one or more updated tokens comprises computing another similarity score that is indicative of a degree of similarity between the one or more marked tokens and the one or more updated tokens. Optionally, classifying the one or more updated tokens comprises computing yet another similarity score that is indicative of a degree of similarity between the one line and the equivalent line.

Optionally, the context similarity score is computed according to a result of applying one or more context similarity tests to the plurality of context tokens and the plurality of equivalent context tokens. Optionally, the similarity score is computed using a metric for measuring the textual distance between strings, such as Levenshtein distance.

Optionally, when one or more differences are identified between the one or more updated tokens and the one or more marked tokens, processing unit 201 classifies the one or more updated tokens as "non-updatable change" subject to the context similarity score being less than an outdated threshold score, indicative of an outdated context. An example of an outdated threshold score is 40%. Other examples of an outdated threshold score are 5%, 10% and 60%.

Optionally, when the context similarity score is equal to or greater than the outdated threshold score and one or more differences are identified between the one or more updated tokens and the one or more marked tokens, processing unit 201 classifies the one or more updated tokens as one of the set of updatable changes. Thus, when one or more differences are identified between the one or more update tokens and the one or more marked tokens and at the same time there is little confidence that the context is similar to the equivalent context, processing unit 201 may classify the one or more updated tokens as "non-updatable change". However, when one or more differences are identified between the one or more update tokens and the one or more marked tokens and at the same time there is higher confidence that the context is similar to the equivalent context, processing unit 201 may classify the one or more updated tokens as an updatable change.

Optionally, when no differences are identified between the one or more updated tokens and the one or more marked tokens, processing unit 201 classifies the one or more updated tokens as "no change" subject to the context similarity score being greater than or equal to a verified threshold score, indicative of a valid context. An example of a verified threshold score is 90%. Other examples of a verified threshold score are 85%, 70% and 45%.

Optionally, when the context similarity score is less than the verified threshold score and no differences are identified between the one or more updated tokens and the one or more marked tokens, processing unit 201 classifies the one or more updated tokens as one of the set of updatable changes. Thus, when no differences are identified between the one or more updated tokens and the one or more marked tokens and at the same time there is a high confidence that the context is similar to the equivalent context, processing unit 201 may classify the one or more updated tokens as being unchanged. However, when no differences are identified between the one or more updated tokens and the one or more marked tokens but at the same time there is lower confidence that the context is similar to the equivalent context, processing unit 201 may classify the one or more updated tokens as an updatable change.

An outdated threshold score may be lower than a verified threshold score.

Optionally, applying the one or more context similarity tests comprises computing a first distance between the one or more marked tokens and the one or more updated tokens. Optionally, applying the one or more context similarity tests comprises computing a second distance between the prefix context and one or more of the plurality of equivalent context tokens equivalent to the prefix context. Optionally, applying the one or more context similarity tests comprises computing a third distance between the suffix context and one or more other of the plurality of equivalent context tokens equivalent to the suffix context. Reference is now made again to FIG. 11. Optionally, the first distance is computed between marked tokens 1121 and updated tokens 1121A. Optionally, the second distance is computed between prefix context 1122 and equivalent prefix context 1122A. Optionally, the third distance is computed between suffix context 1123 and equivalent suffix context 1123A.

Reference is now made again to FIG. 9. In 925, processing unit 201 optionally determines whether the change classification is a member of the set of updatable changes. When the change classification is a member of the set of updatable changes, in 930 processing unit 201 optionally generates an updated source documentation object. Optionally, processing unit 201 generates the updated source documentation object by modifying the at least one text-extract in the textual description according to the change classification and the one or more differences.

Optionally, modifying the at least one text-extract comprises replacing the one or more marked tokens with the one or more updated tokens. Reference is now made again to FIG. 11. In this example, processing unit 201 generates updated textual description 1110A by replacing text-extract 1111 with updated text-extract 1111A.

Reference is now made also to FIG. 13, showing a flowchart schematically representing an optional flow of operations 1300 for modifying one or more text-extracts, according to some embodiments. In such embodiments, in 1310 processing unit 201 identifies in one or more token matches, for example in the one or more token matches identified in 1040 (the marked token matches) a first marked match comprising a first marked token of one or more marked tokens and a last marked match comprising a last marked token of the one or more marked tokens. Reference is now made again to FIG. 12. In this example, in 1310 processing unit 201 identifies first marked match 1231 and last marked match 1232.

Reference is now made again to FIG. 13. In 1320, processing unit 201 optionally selects from the one or more token matches a sequence of marked token matches starting with the first marked match and ending with the last marked match. Reference is now made also to FIG. 13A, showing a schematic diagram showing an exemplary sequence 1300A of marked token matches, according to some embodiments. In this example, sequence 1300A of marked token matches begins with first marked match 1231 and ends with last marked match 1232.

Reference is now made again to FIG. 13. Optionally, in 1340, processing unit 201 selects from the sequence of marked token matches a sequence of updated marked matches, where each of the sequence of updated marked matches comprises an updated token of the sequence of new tokens. Reference is now made also to FIG. 13B, showing a schematic diagram showing an exemplary sequence 1300B of updated token matches, according to some embodiments. In this example, sequence 1300B of updated token matches does not include first marked match 1231, that does not have an updated token of sequence of new tokens 1220.

Reference is now made again to FIG. 13. In 1350, processing unit 201 optionally replaces the one or more marked tokens in the textual description with a sequence of updated tokens according to the sequence of updated marked matches, for example replacing marked tokens 1121 with updated tokens 1121A according to sequence 1300B.

Reference is now made again to FIG. 9.

Optionally, in 940 processing unit 201 associates the updated source documentation object with the new version of the source file. Optionally, in 950, processing unit 201 documents the new version of the source file with the updated source documentation object.

Optionally, processing unit 201 executes one or more of 920, 925, 930, 940 and 950 in response to the identification performed in 915.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant source documentation objects will be developed and the scope of the term source documentation object is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method comprising executing a code in a development environment for:
    documenting a plurality of versions of a plurality of source files of a software program in a plurality of source documentation objects, where at least one of the plurality of source documentation objects comprises a textual description comprising one or more text-extracts, each text-extract comprising at least one marked token extracted from one of the plurality of versions of the plurality of source files;
    accessing a new version of a source file of the plurality of source files, where the new version is newer than a version of the source file from which at least one text-extract of the one or more text-extracts of the textual description was extracted;
    performing an identification of when at least one updated token in the new version of the source file, corresponding to the at least one marked token of the at least one text-extract, is different from the at least one marked token; and
    in response to the identification:
        classifying the at least one updated token as one of a set of change classifications according to one or more differences identified between the at least one updated token and the at least one marked token; and
        subject to the change classification being a member of a set of updatable changes, generating an updated source documentation object by modifying the at least one text-extract in the textual description according to the change classification and the one or more differences.

2. The method of claim 1, wherein the code development environment comprises a file version control system (VCS);
    wherein the plurality of source files is managed by the VCS; and
    wherein the method further comprises identifying the new version in the VCS, where the new version was added to the VCS after the version of the source file from which the at least one text-extract of the one or more text-extracts of the textual description was extracted.

3. The method of claim 1, wherein the plurality of source documentation objects is organized in at least one documentation file each having a plurality of documentation versions;
    wherein the plurality of documentation versions of the at least one documentation file is managed by another VCS; and
    wherein each documentation version of the at least one documentation file in the other VCS is associated with a version of at least one of the plurality of source files in the VCS.

4. The method of claim 1, wherein the source file is organized in a plurality of lines; and
    wherein the at least one text-extract is at least part of one line of the plurality of lines of the version of the source file.

5. The method of claim 4, further comprising identifying in the new version of the source file an equivalent line, equivalent to the one line of the plurality of lines of the version of the source file.

6. The method of claim 5, wherein identifying the equivalent line comprises:
    computing a plurality of line matches between a respective plurality of lines of the version of the source file and another respective plurality of lines of the new version of the source file; and
    identifying a line match of the plurality of line matches comprising the one line.

7. The method of claim 5, wherein performing the identification of when the at least one updated token in the new version of the source file is different from the at least one marked token comprises identifying the at least one updated token in the equivalent line.

8. The method of claim 7, wherein identifying the at least one updated token in the equivalent line comprises:
    computing a sequence of tokens of the one line;
    computing a sequence of new tokens of the equivalent line;
    computing a plurality of token matches between the sequence of tokens and the sequence of new tokens;
    identifying at least one token match of the plurality of token matches comprising the at least one marked token; and
    identifying the at least one updated token in the at least one token match.

9. The method of claim 8, wherein computing the plurality of token matches comprises:
    organizing the sequence of tokens in a sequence of token lines, each consisting of one of the sequence of tokens in order of the sequence of tokens;
    organizing the sequence of new tokens in a sequence of new token lines, each consisting of one of the sequence of new tokens in order of the sequence of new tokens; and
    computing a plurality of token line matches between the sequence of token lines and the sequence of new token lines.

10. The method of claim 8, wherein classifying the at least one updated token comprises:
    identifying in the sequence of tokens a plurality of context tokens;
    identifying in the sequence of new tokens a plurality of equivalent context tokens according to the plurality of token matches;
    computing a context similarity score indicative of a confidence level that the plurality of context tokens is similar to the plurality of equivalent context tokens, according to a result of applying at least one context similarity test;
    and computing a classification of the at least one updated token further according to the context similarity score;
    wherein at least one of:
        at least some of the plurality of context tokens immediately precede the at least one marked token in the one line; and
        at least some other of the plurality of context tokens immediately follow the at least one marked token in the one line.

11. The method of claim 10, wherein classifying the at least one updated token further comprises:

when one or more differences are identified between the at least one updated token and the at least one marked token, classifying the updated token as "non-updatable change" subject to the context similarity score being less than an outdated threshold score, otherwise classifying the updated token as one of the set of updatable changes; and when failing to identify the one or more differences between the at least one updated token and the at least one marked token, classifying the updated token as "no change" subject to the context similarity score being greater than or equal to a verified threshold score, otherwise classifying the updated token as one of the set of updatable changes.

12. The method of claim 11, wherein the verified threshold score is 90%; and wherein the outdated threshold score is 40%.

13. The method of claim 10, wherein applying the at least one context similarity test comprises at least one of:

computing a first distance between the at least one marked token and the at least one updated token, computing a second distance between the at least some of the plurality of context tokens immediately preceding the at least one marked token and one or more of the plurality of equivalent context tokens equivalent thereto, and computing a third distance between the at least some other of the plurality of context tokens immediately following the at least one marked token and one or more other of the plurality of equivalent context tokens equivalent thereto.

14. The method of claim 8, wherein modifying the at least one text-extract in the textual description comprises:

identifying in the at least one token match a first marked match comprising a first marked token of the at least one marked token and a last marked match comprising a last marked token of the at least one marked token;

selecting from the at least one token match a sequence of marked token matches starting with the first marked match and ending with the last marked match;

selecting from the sequence of marked token matches a sequence of updated marked matches each comprising an updated token of the sequence of new tokens; and replacing in the textual description the at least one marked token with a sequence of updated tokens according to the sequence of updated marked matches.

15. The method of claim 1, wherein modifying the at least one text-extract in the textual description according to the change classification and the one or more differences comprises replacing the at least one marked token with the at least one updated token.

16. The method of claim 1, wherein the at least one marked token is one of: a software program identifier comprising a sequence of characters according to a syntax of a programming language of the software program, a delimiter character selected from a set of delimiter characters of the programming language of the software program, a sequence of characters depicting a word in a natural language, and a natural language delimiter character according to another syntax of a natural language.

17. The method of claim 1, wherein the set of change classifications consists of "change to lint-characters", "change to an inner block", "updatable single line change", "no change", and "non-updatable change"; and wherein the set of updatable changes consists of "change to lint-characters", "change to an inner block", and "updatable single line change".

18. The method of claim 1, wherein each of the plurality of versions of the source file is associated with a checksum value; and wherein the source documentation object further comprises the respective checksum value associated with the version of the source file.

19. The method of claim 1, further comprising:

associating the updated source documentation object with the new version of the source file; and documenting the new version of the source file with the updated source documentation object.

20. An apparatus comprising at least one hardware processor configured for executing a code in a development environment for:

documenting a plurality of versions of a plurality of source files of a software program in a plurality of source documentation objects, where at least one of the plurality of source documentation objects comprises a textual description comprising one or more text-extracts, each text-extract comprising at least one marked token extracted from one of the plurality of versions of the plurality of source files;

accessing a new version of a source file of the plurality of source files, where the new version is newer than a version of the source file from which at least one text-extract of the one or more text-extracts of the textual description was extracted;

performing an identification of when at least one updated token in the new version of the source file, corresponding to the at least one marked token of the at least one text-extract, is different from the at least one marked token; and in response to the identification:

classifying the at least one updated token as one of a set of change classifications according to one or more differences identified between the at least one updated token and the at least one marked token; and subject to the change classification being a member of a set of updatable changes, generating an updated source documentation object by modifying the at least one text-extract in the textual description according to the change classification and the one or more differences.

21. A software program product for a development environment, comprising:

a non-transitory computer readable storage medium;

first program instructions for documenting a plurality of versions of a plurality of source files of a software program in a plurality of source documentation objects, where at least one of the plurality of source documentation objects comprises a textual description comprising one or more text-extracts, each text-extract comprising at least one marked token extracted from one of the plurality of versions of the plurality of source files;

second program instructions for accessing a new version of a source file of the plurality of source files, where the new version is newer than a version of the source file from which at least one text-extract of the one or more text-extracts of the textual description was extracted;

third program instructions for performing an identification of when at least one updated token in the new version of the source file, corresponding to the at least one marked token of the at least one text-extract, is different from the at least one marked token; and fourth program instructions for in response to the identification:

classifying the at least one updated token as one of a set of change classifications according to one or more differences identified between the at least one updated token and the at least one marked token; and subject to the change classification being a member of a set of updatable changes, generating an updated source documentation object by modifying the at least one text-extract in the textual description according to the change classification and the one or more differences;

wherein the first, second, third and fourth program instructions are executed by at least one computerized processor from the non-transitory computer readable storage medium.

* * * * *